Aug. 20, 1963

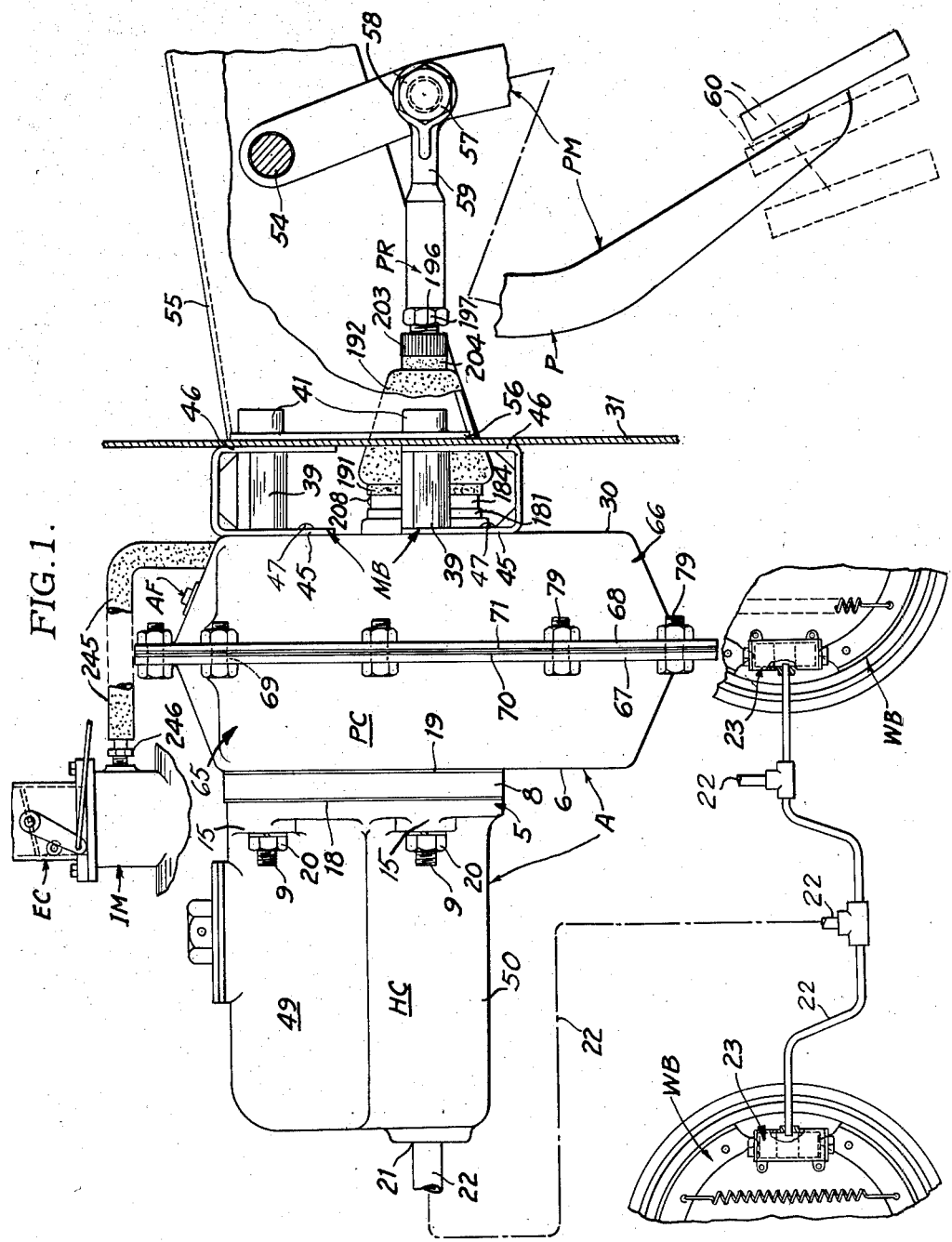

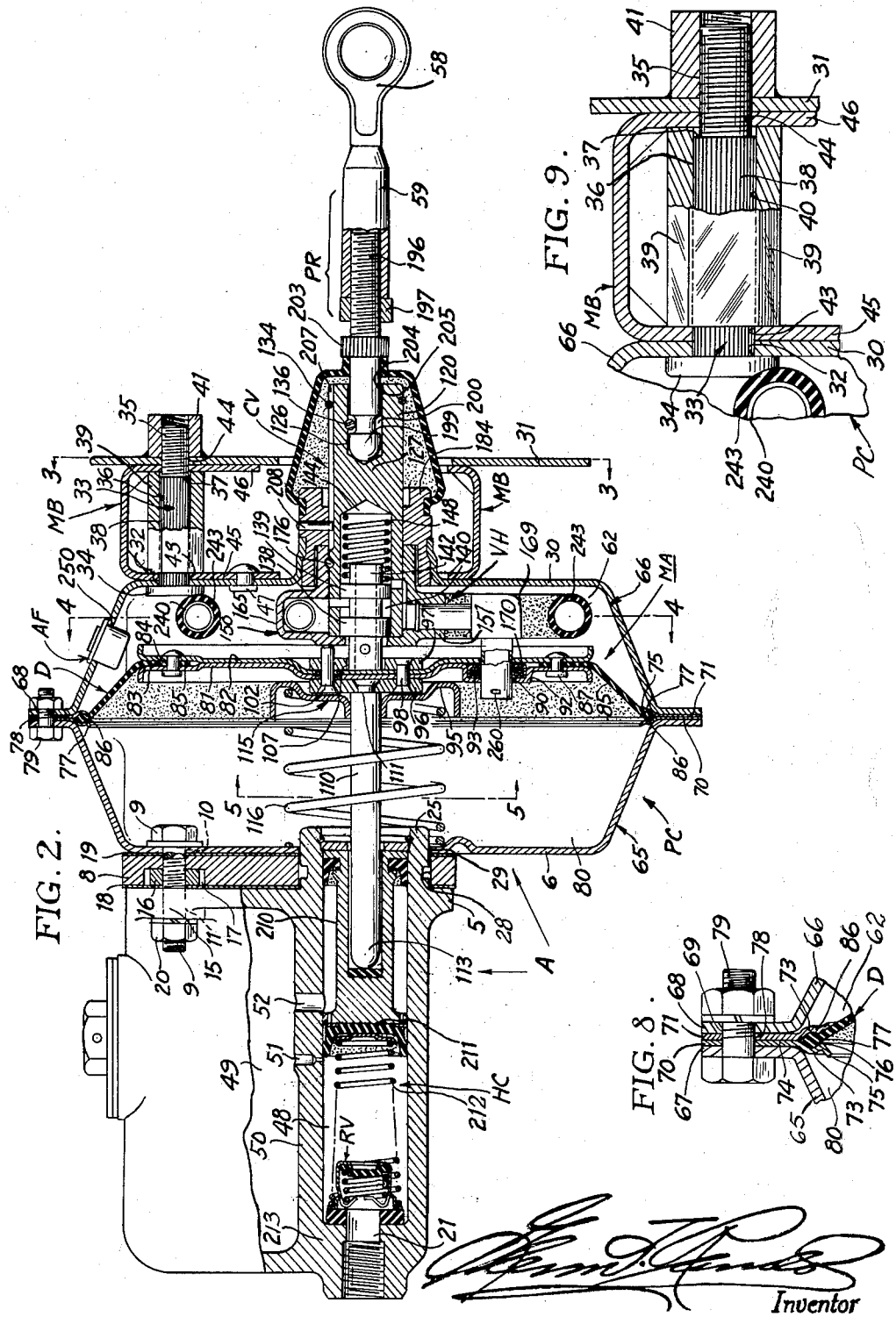

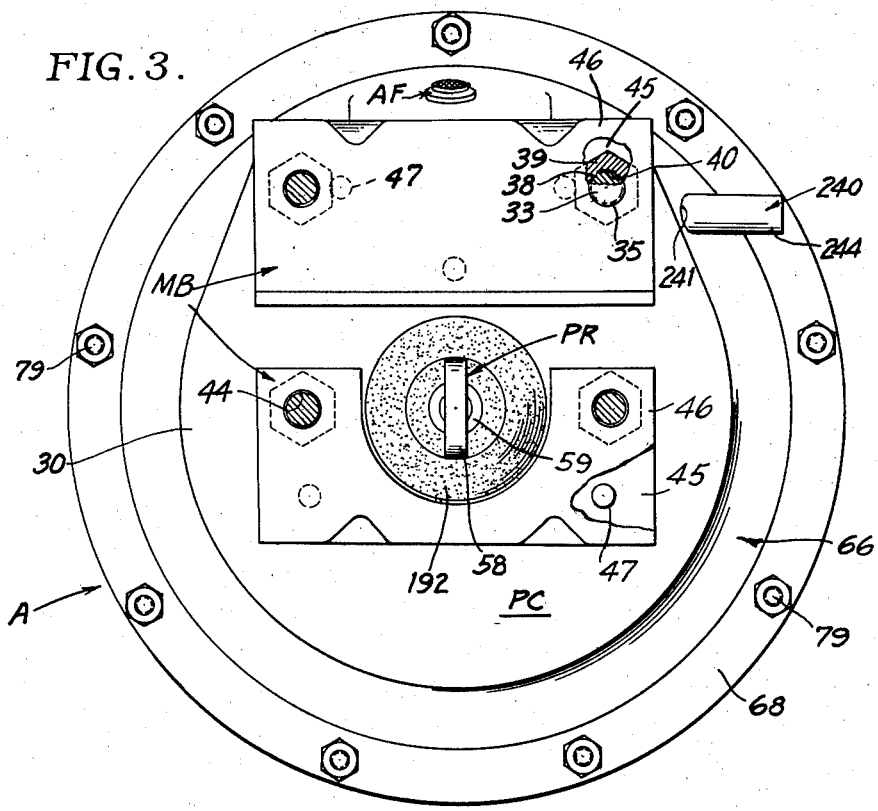
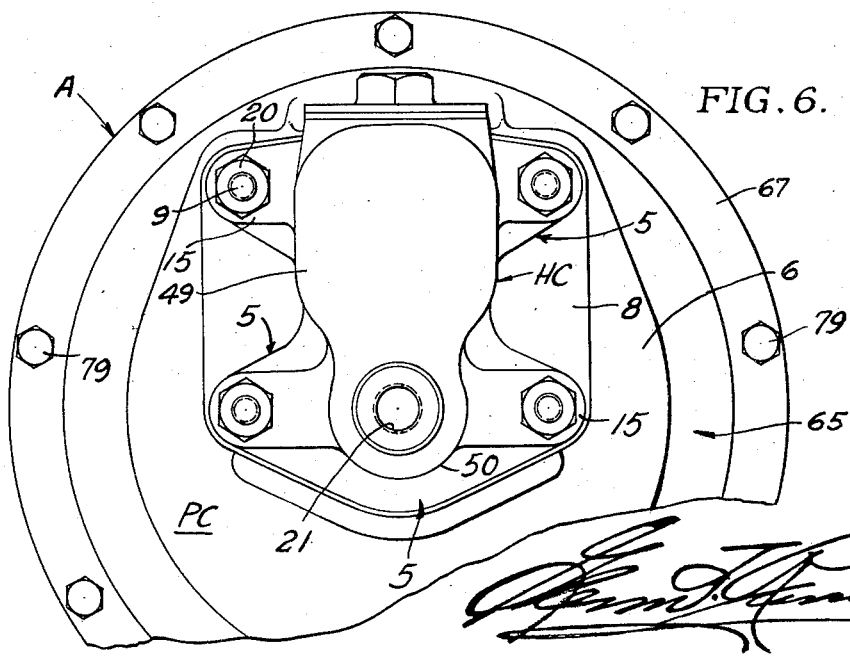

G. T. RANDOL 3,101,032

BOOSTER-TYPE SERVOMOTOR FOR BRAKE SYSTEMS

Filed Sept. 19, 1957

*Inventor*

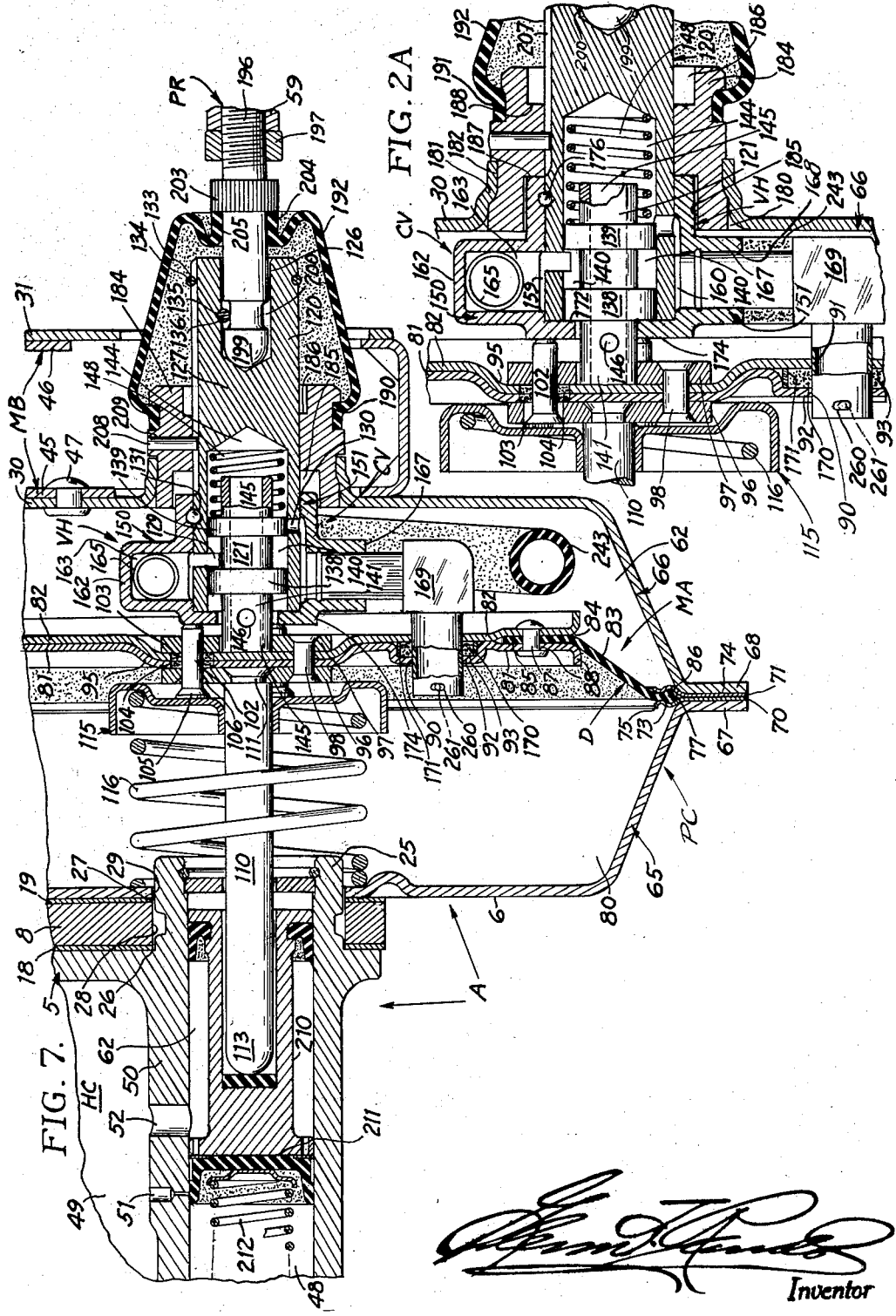

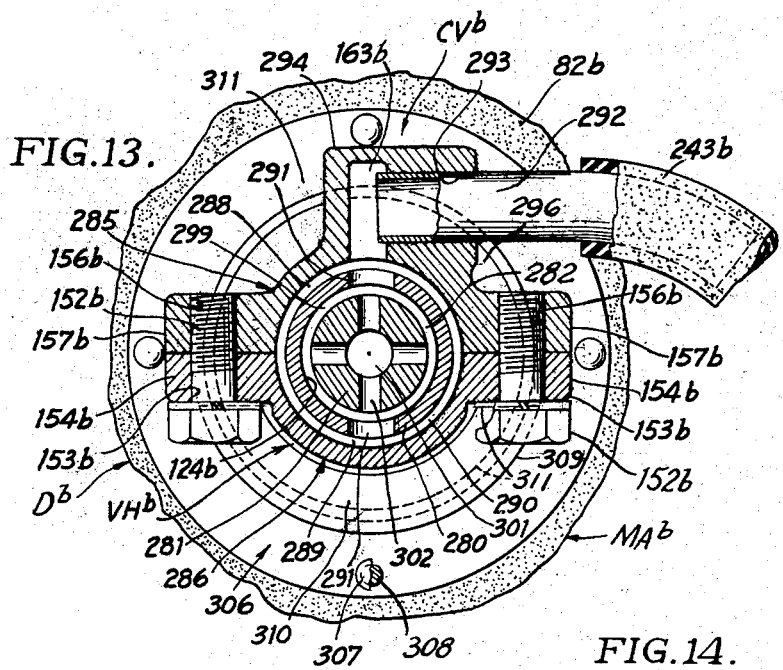
FIG.13.
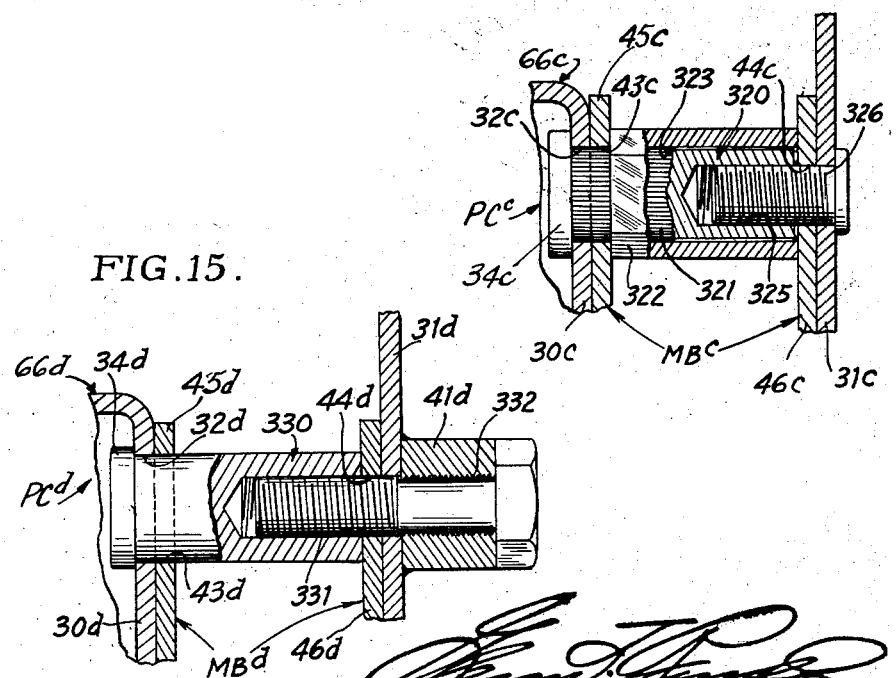
FIG.14.
FIG.15.

United States Patent Office 3,101,032
Patented Aug. 20, 1963

3,101,032
BOOSTER-TYPE SERVOMOTOR FOR
BRAKE SYSTEMS
Glenn T. Randol, 2nd Ave. and Paull St., Box 275,
Mountain Lake Park, Md.
Filed Sept. 19, 1957, Ser. No. 684,946
23 Claims. (Cl. 91—378)

My invention relates generally to booster-type servomechanism for brake systems, adapted for providing the major portion of the operating force to apply the brakes, and particularly to a novel and improved servomotor in operative association with the conventional master brake cylinder of hydraulic brake systems on motor vehicles and the like, said invention constituting an improvement on the servomotor of the general character disclosed in Patent 2,903,855 granted to me September 15, 1959.

The primary object of the invention is to provide such a booster servomotor with an element movable thereby to perform work, movement of said element being opposed by a normally preloaded spring whereby resistance to movement of said element in performing its work induces operation of an operably associated spring-loaded control valve mechanism adapted to control energization of said servomotor under influence of operator-actuation thereof, said work-performing element and valve mechanism in normal disposition being movable as a unit under influence of initial operator-actuator thereof as a function of the force-transmitting capacity of the normal spring load in said valve mechanism; whereupon, reaction from said work-performing element induces modulation of the latter spring load and thereby accommodates the aforesaid operation of the valve mechanism to control said servomotor upon increasing the intensity of operator force thereon. Therefore, hydraulic and/or spring reaction from the master brake cylinder are the sole means for inducing the aforesaid spring load within the valve mechanism to yield under influence of operator-actuation, for the servomotor to attain operative status to apply in part the vehicle brakes, thus producing a wholly new concept in sharp contrast to prior art servomotors that utilize continuous spring-action within the power cylinder directly against the power member movable therein to overcome in part or wholly the spring load on the associated valve mechanism adapted to control activation and inactivation of the power member.

An object importantly related to the above primary object, is the provision of new and improved valve mechanism of the self-contained type as distinguished from prior art control valves incorporated in part or wholly in the pressure-responsive assembly movably disposed in the casing of such servomotors, said valve mechanism having at least two principal spring-loaded elements relatively displaceable from normal disposition to operating disposition for power-activation of said servomotor in response to operating an operator-operated member disclosed herein as a brake-pedal acting directly on one of the elements.

A further object related to the two objects next above is the novel application of said improved control valve mechanism to have slidable support as a unit on a portion of the servomotor casing independently of said pressure-responsive assembly in follow-up engaging relationship therewith, thereby producing a simplified unitary valve mechanism which is structurally separate from the pressure-responsive assembly which it controls so that each of these two principal components may be inspected and serviced independently of the other, readily assembled and disassembled, economical to manufacture, and easily sealed against leakage for long service life without replacement or maintenance otherwise.

Another salient object is to provide novel fluid communication between the variable pressure side of said pressure-responsive assembly by utilizing a flexible conduit to interconnect one side of said valve mechanism with said assembly with the other side of said valve mechanism having continuous communication with a source of pressure different from atmosphere via another flexible conduit, thereby accommodating relative operating movement of the valve mechanism with respect to said assembly to control the latter.

A more specific object is to construct said improved valve mechanism from four principal elements, three of which cooperate to provide a unitary assembly, and the fourth element is telescopically-related to one of the three elements, and movable in unison with the pressure-responsive assembly and relatively with respect to the unitary assembly to control operative energization of the servomotor, said unitary assembly and fourth element being biased apart by a normally preloaded spring to establish the normal "off" disposition of said valve mechanism wherein the servomotor is inactivated.

Another object is to provide a predetermined operating clearance between said pressure-responsive and unitary assemblies in their respective normal positions, said clearance defining the said relative displacement of the unitary assembly and fourth element, and is capable of being fully taken up when the unitary assembly is brought into engagement with said pressure-responsive assembly under influence of operator-actuation to provide "straight-through" operator-actuation of said pressure-responsive assembly in cooperation with or independently of the latter assembly.

Another object of my invention is to provide novel and improved means to facilitate mounting the power cylinder on the firewall of the vehicle, in novel association with the threaded collars or studs with which the vehicle is orginally equipped for mounting the master brake cylinder in operating position on said firewall in the engine compartment.

Still another object of my invention resides in the provision of novel means for anchoring the peripheral marginal portion of a flexible power-diaphragm between the confronting outstanding flanges defining the open ends of a pair of cup-shaped shells which are bolted or otherwise secured together to produce the said power cylinder, said means providing a metal-to-metal connection between said flanges rather than via the outer margin of the diaphragm proper as commonly employed by workers in the art, to improve the rigidity of the power cylinder when assembled, and also to simplify attaching the peripheral portion of the diaphragm adjacent the juncture between said flanges within said power cylinder in airtight relationship to the latter.

In a still more specific sense, my invention seeks to adapt novel power-operated mechanism in combination with the standard components comprising the conventional master brake cylinder, to operate said cylinder with reduced effort on the associated pedal, thereby retaining "pumping" or "feathering" control on long downgrades to prevent dangerous brake "fade" with consequent loss of braking control, and in the event of power failure or inadequacy, the cylinder may be operated directly by the foot pedal in the usual manner with the same mechanical leverage advantage as originally provided by the factory for foot operation alone as is understood. It is, therefore, an aim to provide efficient power braking control with a minimum of mechanism at reduced cost by adding only the power device to the factory installed master cylinder and without altering the pedal-linkage hook-up and mounting arrangement therefor on the vehicle.

With these and other objects and advantages in view, the invention consists of the new and novel combinations, constructions, and arrangements of parts as hereinafter more fully described, set forth in the claims appended hereto, and disclosed in the accompanying drawings forming part hereof, wherein:

FIGURE 1 is a side elevation of my improved booster-type servomotor constructed in accordance with the present invention, and exemplarily shown connected diagrammatically to operate a hydraulic brake system conventionally employed on automotive vehicles and the like;

FIGURE 2 is an enlarged longitudinal sectional view, partly in side elevation, of the servomotor per se shown in FIGURE 1 wherein the vehicle brakes are in fully released condition;

FIGURE 2A is a fragmentary sectional view on a further enlarged scale of FIGURE 2 showing structural details of the power control valve mechanism and closely associated structure;

FIGURE 3 is a rear elevational view of the servomotor showing particulars of the novel means for mounting the same on the motor vehicle, and the air cleaner assembly;

FIGURE 6 is a front elevational view of the servomotor, partly broken away, showing the master brake cylinder;

FIGURE 7 is a fragmentary portion of FIGURE 2 on an enlarged scale illustrating an operated disposition of the servomotor wherein the control valve is about to be "cracked" to induce energization of the power assembly to actuate the master brake cylinder to apply the vehicle brakes;

FIGURE 8 is a fragmentary sectional view of the power cylinder on an enlarged scale to clarify details of the novel means for anchoring the peripheral portion of the flexible power diaphragm to the interior of the power cylinder;

FIGURE 9 is an enlarged fragmentary view, taken from FIGURE 2 of the novel means for attaching the servomotor to the vehicle firewall, to clarify the details of this new feature;

FIGURE 13 is a transverse sectional view taken along the line 13—13 of FIGURE 12 looking in the direction of the arrows, and showing particulars of the vacuum-inlet tube mounting and other details:

Figure 4:
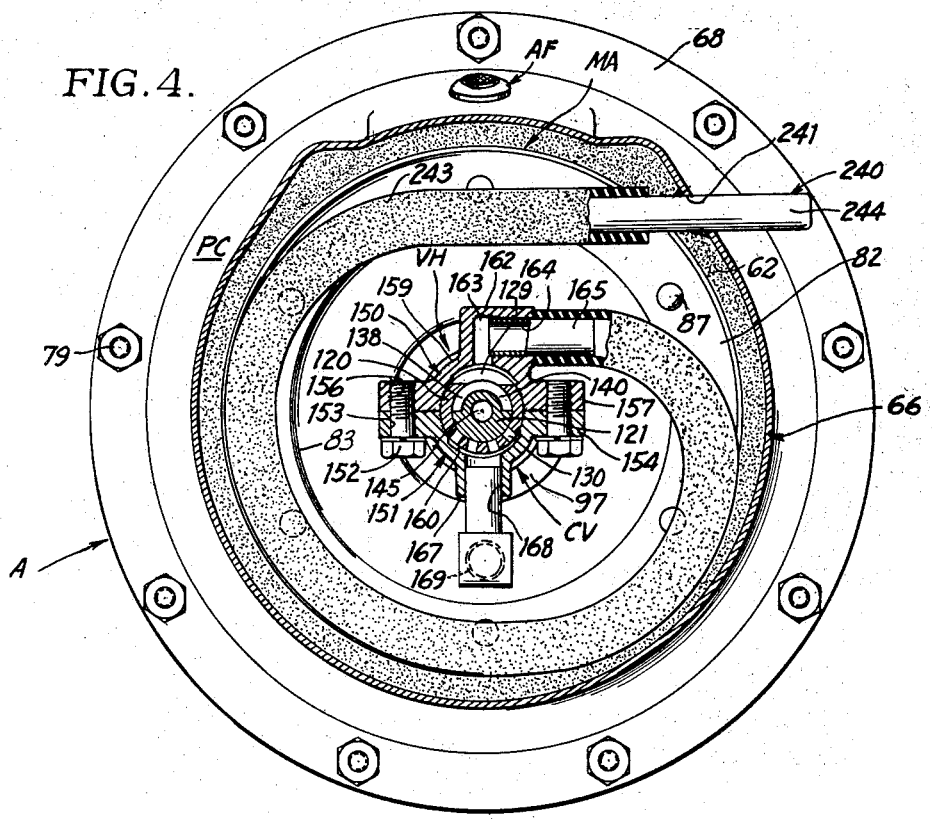
FIGURE 4 is a transverse sectional view taken along the line 4—4 of FIGURE 2 looking in the direction of the arrows, and showing details of the atmospheric side of the movable power member and associated valvular control therefor.

FIGURE 14 is a modified form of the power cylinder mounting means comprising a headed sleeve in lieu of the threaded cap bolt aforesaid, said sleeve having a threaded longitudinal bore for engaging the externally threaded portion of a stud or bolt fixed on the vehicle firewall, and being rotatable in the same manner as the bolt to effect such threaded engagement; and FIGURE 15 is another modified mounting arrangement for the power cylinder consisting of a plurality of cap bolts having an intermediate unthreaded portion enabling threaded insertion of the bolt through the threaded sleeves fixed on the vehicle firewall, from the driver's side thereof, into threaded engagement with cooperating internally threaded bushings rigidly mounted on the rear end wall of the power cylinder to serve as a mounting support therefor.

Like reference characters designate like parts in the several views with like parts in the four modifications being distinguished, however, by suffixing the letters "a," "b," "c," and "d" respectively to each.

Referring now to the drawings, and particularly to FIGURES 1, 2, 8 and 9, my novel and improved booster-type servo-mechanism is generally designated by the reference character "A" and comprises a pressure differential activated servomotor which may hereinafter be referred to as a "booster servo," "booster motor" or power cylinder designated "PC" for flexibility in terminology, in operative association with a master brake cylinder "HC" of conventional construction and operation. The master cylinder body is provided with an integral end flange 5 adapted to mount it on the forward end wall 6 of the power cylinder as by an adapter plate 8 secured to the outer face of said end wall by a plurality of headed bolts 9, preferably four in number, projecting through suitable openings 10 in said wall 6 of the power cylinder and openings 12 in the plate 8, thence through openings 14 through marginal portions 15 of the flange 5. Lock nuts 16 are threaded onto the bolts to secure the adapter plate 8 tightly against the power cylinder end wall to form a unitary assembly thereof, said nuts being received into circular recesses 17 in the forward side of the plate 8 with the exterior sides of the nuts substantially flush with the exterior face of said adapter plate. Sealing gaskets 18, 19 are provided between the plate 8 and confronting faces of the flange 5 and end wall 6 to effect an air-tight assembly between the master and power cylinders. Nuts 20 are threaded onto the exposed threaded portion of the bolts projecting through the openings 14 to draw the faces of the flange 5, gaskets 18, 19, plate 8 and power cylinder and wall 6 tightly together to form the assembly A. The end of the master cylinder HC remote from the power cylinder has a discharge port 21 which is connected by a branched hydraulic line or conduit 22 to one or more hydraulically-actuated motors or wheel cylinders 23, the latter being employed to operate automotive wheel brakes generally designated "WB" in FIGURE 1. An integral hub portion 25 projects rearwardly from the flange 5 through registering circular openings 26, 27, 28 and 29 through the central coaxial portions of the gaskets 18, 19, plate 8 and end wall 6 of the power cylinder respectively, said hub serving to stabilize the master cylinder HC in coaxial disposition with respect to the power cylinder PC as will appear.

The rear or opposite end wall 30 of the power cylinder is preferably spaced, for example, from the forward side of the firewall 31 of the motor vehicle, the latter serving to support the servomotor A in operating position in such installations operated by a suspended-type pedal. This rear wall is provided with a plurality, usually four in number, of circular openings 32 spaced from the axis of the power cylinder in alignment with the openings 10. A corresponding number of new and novel mounting bolts 33 having end circular flanged portions 34 and the opposite end portions 35 externally threaded and projecting outwardly through said openings with the flanged portions in intimate contact with the inner marginal confronting surfaces adjacent said wall openings 32. The threaded portion of the bolts is of less diameter than an intermediate portion 36 between the threaded portion and flanged heads aforesaid to provide an external annular shoulder 37 between the portions 35, 36. The intermediate portion of the bolts is longitudinally splined or otherwise indented at 38 on which is mounted an elongated hex nut 39 for engagement by an open end wrench for manually rotating the same, and its internal surface formed with complemental indentations 40 for cooperating with indents 38 on the intermediate portion whereby rotational movement imparted to the nut, as by said open end wrench manually engaging its hex surface aforesaid, simultaneously rotates the bolts 33 yet accommodating relative sliding movement between the nuts and bolts as is understood. The portion of the splined surface on the bolts which projects externally of the power cylinder end wall 30 is of less length than the length of the nuts splined thereon so as to enable the length of the nuts to establish the mounting space aforesaid between the power cylinder and firewall. A corresponding number of internally threaded collars 41 is secured in the same pattern with respect to the openings 32, to the firewall as by welding in alignment with the bolts 33. Torque manually applied to the hex nuts slidably splined on the bolts, engages the threaded end portions of the bolts into their respective threaded collars on the firewall to impinge the rear wall 30 between the bolt heads and nuts and the latter between the rear wall and firewall when drawn tightly, thereby rigidly securing the power cylinder onto the foreward side of the firewall in operating position. This novel arrangement of mounting the power cylinder and its master cylinder on the vehicle utilizes the factory-installed threaded collars formerly used for mounting the hydraulic master cylinder operated from a pedal pivotally suspended in the driver's compartment of the vehicle, thus enabling installation of the present power-booster on any vehicle equipped with a pendant-type pedal mechanism originally utilized to operate the master brake cylinder, without altering factory construction thereby eliminating special tools and installing procedures as would be required where alterations are prerequisite to such installations of prior art power-boosters. In this way the pedal mechanism aforesaid which is factory installed for supporting the brake master cylinder and suspended-pedal, may be utilized without altering its construction in any way for mounting the servomotor A of the present invention and with equal facility to mounting such conventional master cylinder, thereby making the present power-booster a highly attractive accessory item for field installation on after-market motor vehicles. To add to the appearance and rigidity of the aforesaid novel mounting of the power cylinder, a pair of U-shaped mounting brackets such as generally indicated at "MB" may be employed between the rear end wall of the power cylinder and confronting side of the firewall with suitable registering openings 43, 44 through their legs 45, 46 respectively for reception of the bolts 33 with the inner faces of the legs spaced substantially to the same length as the splined hex-nuts which span the space between said legs, so that when the bolts 33 are tightly threaded into the firewall collars, the hex-nuts are clamped firmly between the bracket legs to securely support the device A on the firewall. These brackets are secured to the outer side of the rear wall of the power cylinder as by a plurality of rivets 47.

The interior of the master cylinder HC comprises: a pressure working chamber 48 and a liquid reservoir 49 separated by a cylindrical wall 50 in which the forward end portion defines the pressure chamber, said wall including a compensating port 51 and an intake port 52 therethrough for controlling liquid communication between the reservoir 49 and pressure chamber 48 and the interior of the cylinder 50 respectively. The pressure chamber is effective to produce the operating pressure transmitted via the discharge port 21 to the wheel cylinders 23, such pressure being developed jointly by the force exerted by a power assembly or wall generally designated "MA" movable within the power cylinder PC and the force exerted by the operator on a preferably suspended-type pedal "P," or by either of the aforesaid operating forces acting independently of each other. The upper end of the pedal P is pivotally supported at 54 on a bracket 55 terminating at its forward end with outturned lateral flanges 56 having the aforesaid threaded collars 41 secured as by welding to said firewall flanges. The bracket 55 is positioned between the firewall 31 and dash panel (not shown) forwardly of the steering column in the operator's compartment of the vehicle, and at a point below the pivot 54, the pedal P is pivotally connected, as by means of a pin 57 inserted through an eye 58 forming the end of an outer section 59 of an adjustable thrust or push-type rod generally shown at "PR" to provide, for example, a 5 to 1 leverage ratio between the thrust connection aforesaid and a foot pad 60 forming the lower terminus of the pedal.

The power cylinder PC is preferably a pressure differential operated servo or motor, utilizing atmospheric pressure to provide the necessary pressure differential across the power assembly MA aforesaid to operatively energize the same. In ordinary automotive installations, a vacuum-operated motor is preferred to one operated by compressed air, since the engine intake-manifold, such as shown fragmentarily at "IM" in FIGURE 1, may serve as the vacuum source.

The vacuum-operated booster servomotor PC in the preferred embodiment of the invention (FIGURE 1) is air-suspended; i.e., air at atmospheric pressure is normally on both sides of the power assembly MA which may take the form of a solid piston or flexible diaphragm, when the apparatus is in released position best demonstrated in FIGURE 2. Although a vacuum-suspended power assembly is readily adaptable in the present invention, there are certain advantages accruing from the use of an air-suspended power cylinder as, for example, chamber 62 of the power cylinder does not have to be sealed because it is constantly vented to atmosphere and therefore termed a "constant pressure" chamber. That is to say, the angular movement of the control rod PR during the pressure stroke does not create any structural problem in the design of the power cylinder. Moreover, operation of an air-suspended power cylinder is inherently smoother and less sensitive than the operation of a vacuum-suspended power assembly. On the other hand, speed of operation, which is the primary advantage of the vacuum-suspended arrangement, is not considered vital in installations where my improved booster servo-mechanism would most likely be used as against installations in heavy-duty installations. Actually, a slowed more controllable build-up of power force during initial stages of vehicular brake application is conducive to preventing sudden stops, particularly those stops during low vehicular speeds as when cruising in congested traffic-light controlled intersections, etc. The power cylinder PC comprises: a pair of cylindrical cup-shaped casings (shells) 65, 66 closed at their outer ends by the end walls 6, 30 respectively, and each having their open confronting ends formed with outturned annular flanges 67, 68 respectively, the latter being provided with a plurality of registering holes 69 therethrough in circumferentially equally spaced relationship. A pair of metallic rings 70, 71 are each formed in cross section with an inner substantially semicircular portion 73 merging with an offset flat outer marginal portion 74 with the confronting sides of the latter portions in intimate contact, and the confronting inner angularly flanged ends 75 of the portions 73 divergently spaced to provide a circular opening 76 leading into an annular substantially circular in cross section channel 77 between the confronting semicircular portions. The flat portions of the rings are provided with a like number of registering holes 78 in alignment with the flange holes 69 for reception of cap bolts 79, for example, with nuts threaded thereon to clamp the two casings and metallic rings in a rigid metal-to-metal unitary assembly with the channel 77 lying adjacent to and between the inner marginal portions of the outturned flanges for an important purpose to appear. The power assembly MA, which is referred to elsewhere in the specification and in certain of the claims as a pressure-responsive wall, power diaphragm, piston or member produces with the inside of the end wall 6 on which the master cylinder HC is mounted, a variable pressure chamber disclosed herein as a vacuum-power chamber 80, said power assembly comprising a pair of cup-shaped juxtapositioned plates 81, 82 mounted back-to-back with their peripheral marginal wall portions offset outwardly at 83 to form an external annular channel 84 therebetween for reception of an inner marginal portion 85 of a ring-type flexible diaphragm generally designated "D," the periphery of said diaphragm being formed as a circular ridge or bead 86 in cross section which engages the annular channel 77 to anchor the diaphragm to the inner side of the power cylinder at the diverging juncture of the two casings aforesaid in airtight sealed relation with respect thereto, it being particularly noted that when the two metallic rings are assembled between the casing outturned flanges and the clamping bolts drawn tightly that the semicircular portions of the metallic rings impose compression on the diaphragm bead to insure its being airtight and securely anchored to prevent vacuum loss from the power chamber. A plurality of fasteners such as rivets 87 are inserted in registering holes 88, 89 circumferentially equally spaced through the offset portions of the plates and the inserted portion of the diaphragm to the plates in an airtight assembly. Inwardly spaced from the rivet holes is a pair of aligned larger openings 90, 91 through the plates 81, 82 respectively with the opening 90 through plate 81 formed with a circular embossment 92 to provide a circular cavity 93 between the two plates for a purpose that will be referred to later. Centrally disposed in each plate is a forwardly extruded cup-shaped offset portion 95 telescopically assembled and reinforced by a pair of circular hub discs 96, 97 for clamping the end walls of the offset portion 95, tightly together as by a plurality, preferably three in number of rivets 98 inserted in registering holes 99, 100, and 101 through the discs and offset portions respectively. Also an equal number of corresponding holes registering through the discs are provided in circumferentially equally spaced relation through which slidable actuating pins 102 project from the forward side of disc 96 through said last-mentioned holes in sealed relation thereto as by a pliant ring seal 103 fitted in enlarged diameter holes 104 through the offset portions 95 aligned with holes 99, 100. The actuating pins 102 are formed with heads 105 tapered inwardly on their underside to normally engage complemental countersinks 106 coaxial with the holes 99 in discs 96 to insure sealing of the power chamber from leaks past the actuating pins when the pins are actuated during power assistance. A central circular opening 107 is provided through the disc 97, and the tapered heads of the assembly rivets 98 are flush with the outer sides of the discs 96, 97.

A work-performing element or push-rod 110 is secured at one end to the central portion of the disc 96 as by peening the end of a reduced diameter shouldered portion 111 forming said end which is pressfitted through a central hole 112 in the disc 96 so that the movable wall and element 110 move as a unit with the free end 113 of the element 110 projectable through the opening 29 in the forward end wall 6 of the power cylinder to operate the master brake cylinder as will be more fully explained later.

Slidably mounted on the work element ahead of the disc 96 is a circular cup-shaped spring seat member engaging the heads 105 of the actuating pins 102. A normally preloaded helically formed compression spring 116 encircles a portion of the element 110 with one end bearing on the marginal surface of the opening 29 in the end wall 6 and the other end reacting on the spring seat member to urge the spring seat to act on the power assembly MA in a releasing direction only (see Patent 2,903,855).

The control valve mechanism generally designated "CV" is of new and novel construction and operation and comprises: an outer and inner telescopically-related cylindrical element 120, 121 more specifically designated a valve sleeve and a valve piston respectively. The valve sleeve 120 having a longitudinal bore 124 extending from its inner end to a medial point substantially therein and a reduced diameter longitudinal bore 125 extending from the other end to such depth as to provide a thrust wall 127 between the inner closed ends of said bores. Spaced from the inner end of the outer element is a cross slot 129 through the wall thereof communicating with the bore 124, and longitudinally spaced rearwardly from said slot 129 is a plurality of air-vacuum control ports 130 through the wall of the outer element in diametrically disposed relation and communicating with the bore 124. A recess 131 is provided in the outer surface of the element 120 in rearwardly spaced relation to the ports 130 and adjacent the outer end of the element 120 is an annular groove 133 formed in the exterior surface thereof for reception of a split-type stop ring 134. Transversely disposed of the element 120 is a bore 135 communicating with a portion of the bore 126 and through which a pin 136 is pressfitted to serve as a retainer for the forward end of the push rod PR. The inner valve element 121 is a spool-type piston comprising a pair of longitudinally spaced annular lands 138, 139 defining an annular vacuum chamber 140 therebetween in constant communication with the slot 129, the outer ends of said lands terminating in reduced diameter extensions 141, 142 respectively. The free end of the extension 141 is loosely piloted in the disc opening 107 aforesaid to maintain substantially coaxial relationship between the control valve mechanism CV and the power assembly MA, and also to enable the end of this extension to engage the confronting exposed surface on the diaphragm plate 82 and thereby move as a unit therewith to produce the usual follow-up action of the control valve means CV, since the outer and inner valve elements 120, 121 slide relatively to each other to effect opening and closing of the valve ports 130, which valve control positions correspond to "on" operating position and normally closed "off" position for power-activation and inactivation respectively of the booster motor PC. Valve land 139 is spaced from the thrust wall 127 to provide an atmospheric valve chamber 144 therebetween with the latter connected to the atmospheric chamber 62 of the power cylinder via an axial passageway 145 coextensive with the inner valve piston 121 and a cross passageway 146 through the extension 141 which intersects the passageway 145. The valve land 139 is operable to selectively connect the ports 130 to the atmospheric valve chamber 144 and to the vacuum chamber 140 between the said valve lands, said vacuum chamber being subject to vacuum at all times via slot 129 when the vacuum source IM is effective to produce negative pressure (sub-atmospheric) conditions. Operably positioned within the valve chamber 144 is a normally preloaded helically formed compression spring 148 having one end bearing on the thrust wall 127 and the other end piloted by the extension 142 and reacting on the confronting face of the valve land 139 to bias the valve elements 120, 121 apart and accommodate their movement toward each other within the limits of the relative operating movement normally obtaining between the outer valve element and confronting side of the disc 97 to enable the pair of valve elements to move relatively to each other to control operative energization of the power cylinder PC as will appear. Accordingly, combined spring and hydraulic reaction from the master cylinder HC via the work element 110 against the valve piston 121 induces the spring 148 to yield as a function of operator-actuation of the valve sleeve 120 in unison with the piston 121 and then relatively thereto in that order, such relative displacement of the valve sleeve 120 positions the control ports 130 to the left of working land 139 for power-activation of the servomotor PC, and irrespective of the installed load of the spring 148 in the valve mechanism CV, either spring- or fluid-pressure reaction on the master cylinder piston, or both pressures jointly are requisite for the control valve sleeve and piston 120, 121 respectively to relatively adjust for the servomotor PC to attain operative status. Encircling the outer valve element 120 is a valve housing designated "VH" comprising two semicircular segments 150, 151 clamped around the outer valve element in airtight sealed relationship by a pair of hex cap screws 152 projecting through holes 153 in a pair of laterally extending flanges or ears 154 forming the ends of the arcuate portion of the lower segment 151, into threaded engagement with internally threaded holes 156 formed in complemental lateral flanges or ears 157 forming the ends of the arcuate portion of the upper segment 150 to thus tightly clamp the two halves 150, 151 of the valve housing VH about the outer valve element in airtight sealed relation thereto. Formed in the inner curved surface of each of the segments 150, 151 is a rectangular-shaped arcuate cavity 159, 160 respectively, the cavity 160 in the lower segment 151 having continuous communication with the ports 130, and the cavity 159 in the upper segment 150 having continuous communication with the slot 129. Aligned with the cavity 159 in the upper segment is an L-shaped boss 162 integral with the circular wall of said segment, said boss having a vertical passageway 163 communicating with said cavity and an angular passageway 164 intersecting the vertical passageway, and a rigid tube 165 pressed into the angular passageway to provide a vacuum inlet into the interior of the control valve means CV. The exterior of the lower segment circular portion is formed with a circular depending boss 167 having a coaxial passageway 168 communicating with the cavity 160. A rigid elbow-type tube 169 has the end of its vertical portion pressed into the passageway 168 and the end of its horizontal portion projecting through the openings 91, 90 in the diaphragm plates 82, 81 respectively to connect the opposite side of the interior of the control valve mechanism CV to the vacuum-power chamber, said connection including a ring-type pliant sealing member 170 in the cavity 93, which encircles the exterior of the horizontal portion of the tube 169 that projects through the holes 91, 90 in the diaphragm plates aforesaid, and a contractible spring 171 encircling the outer periphery of the seal 170 to subject the same to continuous radially inward pressure to insure effective sealing between the tube and power chamber and at the same time accommodating limited relative movement between the tube and movable wall MA. The complemental semi-circular valve housings are each formed at their inner ends with an inturned semi-circular flange 172, 173 respectively which in assembled relation provide an annular inturned flange 174 the inner side thereof being adapted to engage the inner end of the valve sleeve 120 and be operatively engaged by the peripheral marginal surface on the confronting side of the valve land 138 to limit axial displacement between the pair of valve elements aforesaid under influence of spring 148. The opposite side of the flange 174 is predeterminately spaced normally from the disc 97 and constantly engages the rearwardly projecting free ends of the actuating pins 102 whereby movement of outer valve element to open the control valve means CV, actuates the pins 102 relatively to the diaphragm plates to move the spring seat member 115 as a unit, and additionally compresses the spring 116 to provide increased tension acting against the outer valve element which is progressively induced in accordance with the effective operating stroke of the movable wall MA as a measure of the pressure being exerted by said movable wall on the liquid in the hydraulic pressure chamber 48. It should be noted here that during energization of the power cylinder PC, the spring 116 reacts only on the spring seat 115 and outer valve element to prevent power loss which would result should the movable wall be required to overcome the force of this spring as in prior art devices.

Spaced forwardly from the outer end of the circular segment of the upper valve housing 150 is a recess 175 in the curved surface thereof registering with the recess 131 in the outer valve element, said recesses receiving an element such as a steel ball 176 to lock the valve housing VH against movement with respect to the outer valve element.

A central opening 180 is provided in the rear end wall 30 of the power cylinder casing 66 in coaxial disposition with respect to the forward opening 29 in the casing 65. The marginal portion of opening 180 is formed with an outturned circular flange 181 for radial closure inwardly into an external annular groove 182 formed in the outer cylindrical surface of a bearing collar 184 to make the collar rigid with the end wall 30. The interior of the collar is provided with inner and outer counterbores 185, 186 respectively in coaxial disposition to form medially thereof a pair of spaced annular shoulders 187, 188 and a longitudinal bore 189 interconnecting said shoulders, the latter bore serving as a bearing support for the rearwardly projecting portion of the outer valve element 120 best demonstrated in FIGURE 2. Shoulder 187 is engageable by the rear or outer ends of the valve housing segments aforesaid to establish the control valve mechanism CV in its normally released position, and the other shoulder 188 is engageable by the split stop ring 134 carried by the outer valve element 120 to limit the operating stroke of the latter element. Another external annular groove 190 is provided on the collar 184 rearwardly spaced from the end wall 30 for receiving the forward annular retaining bead 191 of a conventional flexible boot 192.

The pedal push-rod PR is preferably constructed of the outer section 59 and an inner section 196 having their confronting ends telescopically inter-threaded and a lock nut 197 on the externally threaded portion of section 196 for locking the two sections as a unit in their axially adjusted position. The section 196 has its free end portion projecting into the bore 126 to engage the thrust wall 127 and terminates in a dome-shaped head 199 with an annular space 200 adjacent thereto through which the securing cross pin 136 projects to act as a retainer for that section of the push-rod and provides a universal action between the dome-shaped head and thrust wall, the other section 59 of the push-rod has its free end terminating as the previously mentioned eye 58 which is pivotally connected to the pedal P by means of the pin 57 whereby movement of the pedal simultaneously moves the valve sleeve 120 to operate the control valve means CV to its open positions causing the power cylinder to operate accordingly. An exteriorly knurled annular flange 203 is formed integral with the medial portion of the push-rod section 196 in normally spaced relation from the outer end of the control valve sleeve 120, said flange being engaged by an annular bead 204 forming the smaller open end 205 of the dust excluding boot and through which the rod section 196 projects, to prevent foreign matter from wearing the bearing surfaces between the collar support for the valve sleeve 120 and between the thrust wall and push-rod engaging end best demonstrated in FIGURE 2.

An optional feature of construction associated with the bearing collar and outer valve sleeve 120 is a longitudinal surface groove 207 in the exterior surface of the sleeve, and a pin 208 pressfitted through a radially disposed hole 209 through the wall of the collar and medially positioned between the shoulders 187, 188 into engagement with said groove to prevent relative rotation between the valve sleeve and collar while accommodating relative sliding movement of the sleeve.

The cylinder 50 of the master brake cylinder HC is fitted with the conventional spool-type piston 210 and cup seal 211 reciprocal as a unit therein, and return spring 212 for said piston which reacts between said piston via its cup seal and the end wall 213 which closes the forward end of said cylinder 50 and through which the aforesaid discharge port 21 passes to convey fluid displaced under pressure from the working chamber 48 to actuate the wheel cylinders 23 as is understood. The resistance provided jointly by the pressurized column of brake fluid and return spring 212 reacts on the booster servo PC upon initial operator-actuation of the control valve CV, power assembly MA and hydraulic piston 210 as a unit until the force-transmitting capacity of the preloaded status of valve spring 148 is exceeded by operator force applied to the above three operating components while substantially stationary due to the non-compressible column of brake fluid reacting on said hydraulic piston 210. Under these circumstances, additional operator force applied to pedal P causes valve spring 148 to yield thus accommodating relative displacement of the valve sleeve 120 with respect to the valve piston 121 to open control ports 130 for power-activation of the booster servo PC to assist in operating the master brake cylinder HC for the purpose.

It is thus seen that the preferred operation of the present booster servo PC requires that spring 148 be installed under greater tension than spring 212 so that initial unitary movement of the principal operating components; namely, the control valve CV, power member MA and hydraulic piston 210 occurs in response to initial operator-actuation of the pedal P to provide the special advantage over prior art booster servos of smooth brake applications. This unitary movement of the aforesaid components conditions the master brake cylinder HC to pressurize the brake fluid by taking up the slack in the brake system in readiness for power-assist when activated by opening of the control valve CV under additional operator-actuation upon the aforesaid components becoming substantially stationary to enable the preloaded status of spring 148 to be overcome thus yielding to accommodate relative displacement of the valve sleeve 120 with respect to the valve piston 121 to relative operating positions shown in FIGURE 7 wherein the control ports 130 are about to be "cracked" to evacuate air from the vacuum-power chamber 80 for power-assist by the booster servo.

At the very onset of the aforesaid unitary movement of the principal components, the reactive and return spring 116 is effective to supply immediate resistance to pedal depression and therefore serves as the means for transmitting a progressively increasing reactive force (resistance) to the pedal P via the valve sleeve 120 which characterizes the function of its counterpart (spring 106) first disclosed in Patent 2,903,855 which reacts on the inner valve element (piston 124) of this patented structure.

If spring 148 were installed under less tension than spring 212, then an erratic and sudden response from the booster servo would occur due to the operator not having the necessary resisting "feel" for predictable control thereover. This lack of proper operator control plus idle travel of the operating parts under influence of the energized booster servo, rather than the operator as preferred, to take-up the slack in the brake system would combine to produce a power-assist braking control difficult to control therefore over-sensitive with consequent lurching of the vehicle during brake applications.

During power-activation to apply the vehicle brakes, the spring cup 115 and pins 102 connecting it to the valve sleeve 120, move as a unit to nullify reaction from spring 116 on the power member MA since under these conditions reaction from spring 116 is transmitted solely to the pedal P.

A rigid vacuum-inlet tube 240 projects through the cylindrical wall of casing 66 at 241, the inner projecting portion 242 receives one end of substantially a convolution of flexible conduit 243 and the other end of said conduit is attached to the tube 165 leading from the upper valve housing segment 150 whereby vacuum inlet to the arcuate cavity 159 and relative operating movement of the control valve mechanism CV with respect to the power cylinder through the full operating stroke of the movable wall MA are provided. The outer projecting portion 244 of the tube 240 receives one end of a flexible conduit 245 and the other end of conduit 245 is connected to a tubular fitting 246, threaded, for example, into the wall of the engine carburetor generally designated "EC" for continuous communication with the interior of the engine intake-manifold IM, thereby completing the vacuum connection to the control valve housing VH, as shown in FIGURES 1 and 2.

An air filter device generally designated "AF" of conventional construction is pressfitted through a circular opening 250 in the cylindrical wall portion of the casing 66 for venting the power cylinder chamber 62 to atmosphere and for preventing foreign matter from entering said chamber and consequent involvement of the working parts within the power cylinder. This filter device further serves to silence the ingress of air when the power device PC is being operated to released position in response to removing pressure from the pedal P to take the vehicle brakes "off" as is understood.

A cotter pin 260 is inserted through diametrically disposed holes 261 adjacent the end of the tube 169 extending into the power chamber 80 to prevent this tube from becoming disconnected from the movable wall MA as a result of fortuitous separation of said wall and control valve assembly CV in excess of the normal operating clearance therebetween. If the tube should become disconnected from the movable wall such would render the device A inoperative. Such a separation of the above two components sufficient to disconnect the tube 169 from the movable wall MA is quite unlikely since release of the control valve sleeve 120 enables the spring 116 to also act on the movable wall resulting in the movable wall and control valve assembly moving as a unit toward their respective released positions shown in FIGURE 2. The cotter pin serves as a safeguard against any possibility of the tube 169 becoming separated from the diaphragm plates 81, 82 and therefore, limits the extent of displacement between these parts so that the tube 169 slidably projects at all times through the plate openings 90, 91.

OPERATION

The operation of my improved booster-type servomechanism will be apparent from the foregoing description but may be summarized as follows:

Assuming that the servo A is installed on a motor vehicle as the present disclosure exemplarily demonstrates in FIGURE 1, to operate the hydraulic brake system commonly employed on such vehicles, and in released "brake off" condition as depicted in FIGURES 1 and 2. With the engine running, sub-atmospheric pressure (vacuum) is produced within the intake-manifold IM which is conveyed through conduits 245, 243, tube 165, arcuate cavity 159, slot 129, to evacuate air from vacuum chamber 140 on the control valve piston 121 which conditions the control valve mechanism CV for operation to control operative energization of the power cylinder PC as is understood.

In the normally released disposition of the control valve sleeve and piston 120, 121 respectively, portrayed in FIGURES 1 and 2, the atmospheric and power chambers 62, 80 respectively, are vented to atmosphere thereby balancing pressures in said chambers for power-inactivation of said booster motor PC, the power chamber being vented via tube 169, arcuate cavity 160, ports 130 disposed to the right of annular valve land 139 in substantially half-open condition communicating with valve chamber 144, passageways 145, 146, atmospheric chamber 62 and thence to atmosphere via the air filter device AF, and, as previously stated the chamber 62 is in continuous communication with the atmosphere via said filter device. Accordingly, the power cylinder may be termed "air-suspended" when the power member MA and related parts are in their respective normally released positions as shown in FIGURE 2 wherein both chambers in said power cylinder are vented to atmosphere.

Initial depression of the pedal P to its first dashed line position of FIGURE 1 simultaneously moves the valve sleeve and piston 120, 121, movable power assembly MA, work element 110 and hydraulic piston 210 against return spring 212 which advances the piston cup seal 211 into the hydraulic cylinder 50 to the position shown in FIGURE 7 wherein the compensating port 51 is closed thereby conditioning the master cylinder HC for operation to build up pressure on the brake fluid confined in the working chamber 48 and displace the same through the one-way check-valve of the residual pressure check-valve RV into the discharge port 21 and thence via the hydraulic lines 22 to the wheel cylinders 23 to expand the brake shoes into frictional contact with the internal cylindrical surface on the brake drums rotatable with the vehicle road wheels to brake the wheels. This initial unitary movement of the parts aforesaid is effected by operator effort on the pedal P transmitted through the preloaded status of the control valve return spring 148. This latter spring is preferably preloaded at 10 to 15 pounds above the normal preloaded strength of the hydraulic piston return spring 212 to enable the spring 148 to transmit sufficient operator force to move the parts aforesaid initially by overcoming the return spring 212. The master cylinder piston return spring in conventional practice is usually set to establish a normally preloaded condition of around 8 pounds against the residual pressure check-valve RV to re-establish the minimal line pressure in the hydraulic lines external to the pressure working chamber 48 at approximately 8 pounds. Continued pressure on the pedal P, after the compensating port 51 has been closed in the manner stated above, advances the hydraulic piston 210 against spring 212 farther into the pressure cylinder 50, and simultaneously moves the power assembly MA and control valve CV as a unit until pressure build-up against said piston 210 substantially stabilizes it thus forcing the spring 148 to yield whereby the control valve sleeve 120 moves relatively to the control valve piston 121 toward the diaphragm plate disc 97 for power-activation of said power cylinder PC, such relative operating movement being provided by the predeterminately spaced normal disposition of the inner flanged end 174 of the valve housing VH with respect to the said disc 97 best demonstrated in FIGURE 2, it being recalled here that the forward extension 140 on the valve piston 121 abuts the bottom of the disc opening 107 so that the valve piston 121 moves in unison with the power assembly MA under influence of the valve return spring 148 when operating at or above its preloaded status. When the preloaded status condition prevails, which corresponds to the normal relative disposition aforesaid between the valve sleeve 120 and hub disc 97, the control valve CV may be said to be fully closed or "off," that is to say, the power chamber 80 is vented to atmosphere to provide balanced pressure in the power cylinder. The aforesaid relative operating movement of the outer valve element 120 against spring 148 moves the ports 130 into increasing exposure with respect to the annular vacuum chamber 140 after first cutting off communication of these ports with the atmospheric valve chamber 144 thus causing evacuation of air from the power chamber 80 via the tube 169 and connected arcuate cavity in the lower half of the valve housing VH to render the atmospheric pressure acting across the opposite side of the diaphragm plates 81, 82 effective to operatively energize the same and the connected hydraulic piston 210 to move forwardly to provide power assistance in applying the brakes.

The operator is apprised of the degree of braking pressure being developed before and after the power phase becomes effective by the reactive force continuously exerted on the control valve sleeve 120 and pedal P via the push rod PR, by the reactive and return spring 116 acting on the valve sleeve via the spring seat member 115 and actuating pins 102. This spring is characterized by increasing tension above a normally preloaded condition progressively induced in response to the distance the pedal is operated in a brake-applying direction, and it also performs the dual functions of acting simultaneously on the power assembly MA and valve sleeve 120 in a brake-releasing direction only. When the spring seat member 115 is brought into engagement via the actuating pins 102 with the diaphragm disc 96, the relative movement of the outer valve element 120 with respect to the diaphragm disc 97 is re-established in readiness for an ensuing brake-applying cycle. The length of the actuating pins is equal to the width of the hub offset portion 95 of the diaphragm plates and discs 96, 97 and the space between the forward end of the control valve housing VH and confronting disc 97 whereby the reaction of the spring 116 on the set member 115 is not transmitted to the power assembly MA when the pedal P is operated in a power energizing direction thus enabling this spring to provide the "feel" reaction on the pedal without power loss to overcome the force of this spring.

The aforementioned functions of spring 116 are analogous to those of its counterpart (spring 106) first disclosed in my Patent 2,903,855 with the exception that spring 116 of the present disclosure reacts on the outer valve element (sleeve) 120 while in the patented structure its counterpart reacts on the inner valve element (piston 124). Reference may be had to this patent for a more comprehensive understanding of the operational characteristics of spring 116 as applied in the present booster servo PC.

The foregoing operation completes what may be termed the "applied stage." With the brakes in applied condition, if the operator effort on the pedal P is halted, the power member member MA will slightly advance in a brake-applying direction carrying with it the control valve piston 121 relatively to the control valve sleeve 120 to produce what may be termed the "poised or holding stage" at any applied position of the hydraulic piston 210. This latter operating stage results from the usual follow-up action of the control valve elements 120, 121 by a "lapped" condition of the ports 130 with respect to valve land 139 induced by the aforesaid slight relative movement of the power assembly MA with respect to the valve sleeve 120 in the event brake pedal movement is halted as exemplified in FIGURE 7 by the dashed line position of valve land 139. Thus, the brakes may be held "on" with minimum operator effort on the pedal P as a result of substantial counterbalance between the differential pressures acting on the power diaphragm MA and the existent hydraulic pressure reaction in the hydraulic lines 22 against the head end of the piston 210. If the motor PC should fail to be effective to provide power assistance, the force exerted by the operator on the pedal P will bring the inner flanged end of the control valve housing VH into engagement with the confronting disc 97, and wherein the relative movement aforesaid therebetween is fully taken up and the pair of valve elements 120, 121 relatively positioned wide open or "on" with respect to the vacuum source and power chamber 80, thus enabling the operator to operate the hydraulic piston 210 directly with physical force alone to attain full displacement of liquid in the hydraulic lines 22 according to the braking force required to stop the vehicle. With the power phase effective, however, incremental depressing and releasing movements of the brake pedal P cause corresponding follow-up movements substantially of the power assembly MA to apply and release the vehicle brakes in a manner replete in the power brake art.

Due to the exactness of the follow-up action of the control valve means CV and the ever present reaction of the spring 116 on the pedal P, there is never any tendency of the power phase to "over brake" at any given applied position of pedal movement which contributes the highly desirable feature of smooth stops at low vehicular speeds due to instinctively predictable control. At high speeds dangerous "grabbing" or "locking" of the vehicle ground wheels is prevented thus producing smooth vehicular deceleration with reduced operator effort, in accordance with the pressure applied on the brake pedal.

When pressure on the pedal P is removed, springs 212, 116, and 148 react to reset the hydraulic piston 210 under influence of spring 212 to released position shown in FIGURE 2, the spring seat member 115 biased into engagement with the forward side of the power diaphragm assembly MA via pin heads 105 by spring 116 to establish said assembly and control valve elements in their respective released positions wherein the relative operating movement between the power diaphragm and control valve sleeve 120 is restored through the cooperative influence of the springs 116 and 148 which operations re-establish the "released" or brake "off" position shown in FIGURE 2 in which the power chamber 80 is in communication with the atmosphere. As air enters the power chamber 80 via ports 146, 145, chamber 144, ports 130, and tube 169, the differential pressures are reduced, and eventually dissipated, enabling springs 212 and 116 to return the hydraulic piston 210 and power diaphragm MA to their respective released positions portrayed in FIGURES 1 and 2 wherein the rear end of the control valve housing abuts the collar shoulder 187.

During the return stroke, a predetermined pressure is retained in the hydraulic lines by means of the conventional residual pressure check-valve RV. If the pressure in chamber 48 falls below atmospheric pressure during the return stroke, liquid is drawn from the reservoir 49 past the cup seal 211 into the chamber 48 to maintain said chamber filled. When the brakes are fully "off" or released as shown in FIGURES 1 and 2, the residual check-valve RV influenced to seat by spring 121 will establish the minimum residual pressure in the hydraulic lines, such as, for example, approximately 8 p.s.i., and with the port 51 open, any excess liquid in the system returns through said port to the reservoir and vice versa if additional liquid is required in the system. Therefore, the port 51 is termed the "compensating" port.

*Modified Fluid Connection to Power Chamber (FIGURE 11)*

Figure 5:
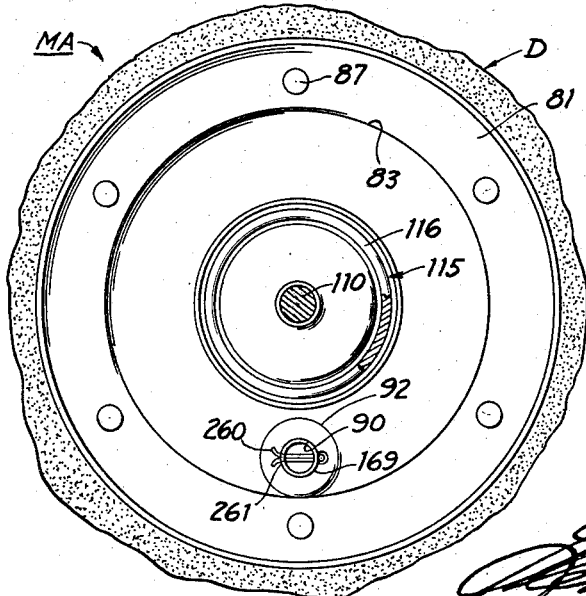
FIGURE 5 is a transverse sectional view taken along the line 5—5 of FIGURE 2 looking in the direction of the arrows, and showing the vacuum-air side of the power assembly and plunger (push rod) actuated thereby.
Figure 10:
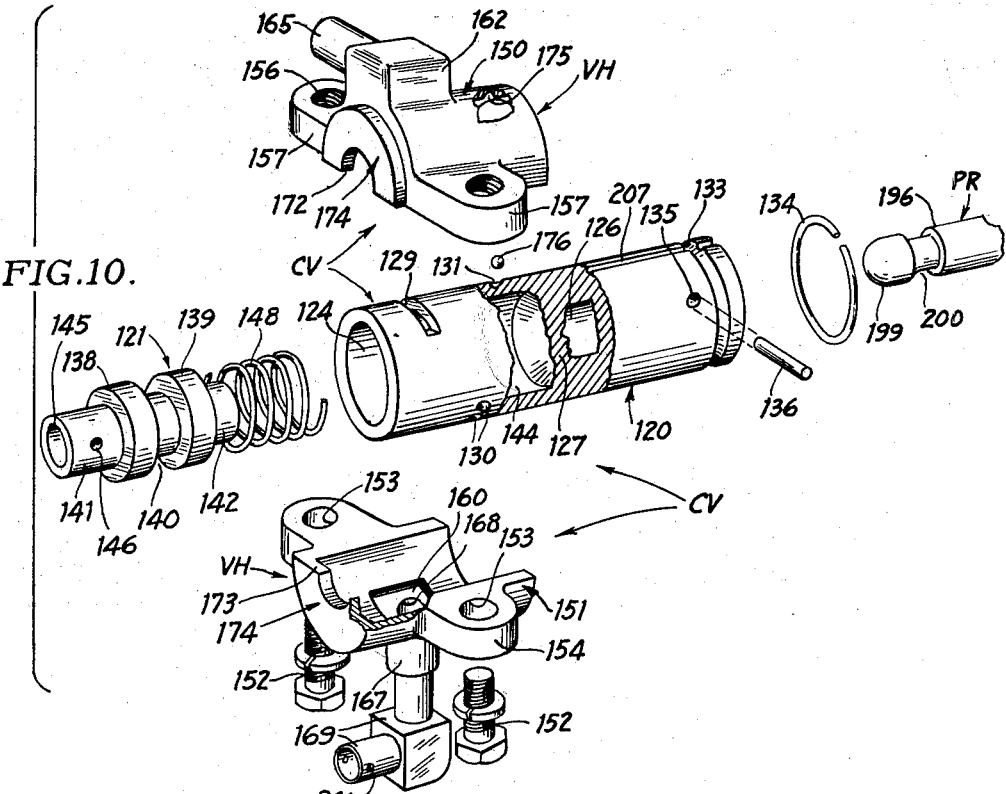
FIGURE 10 is an exploded perspective view of the control valve mechanism.
Figure 11:
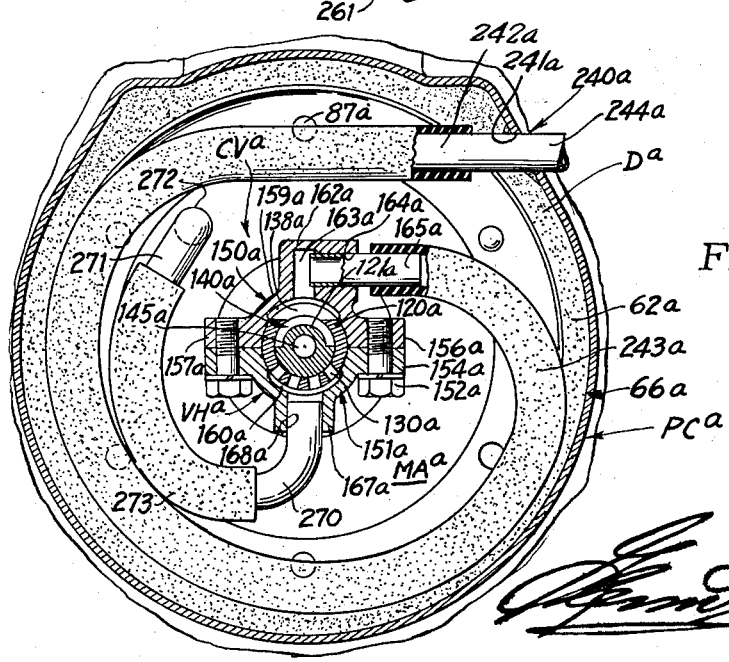
FIGURE 11 depicts a modified connection between the control valve and power diaphragm, comprising a flexible conduit, said view being taken along the same plane as FIGURE 4.

FIGURE 11 illustrates a modified air-vacuum connection between the control valve and power diaphragm in which parts corresponding to those previously described are designated by like reference characters distinguished, however, by suffix "a." In this modified embodiment a rigid elbow-type tubular fitting 270 is substituted for the fitting 169 of the main embodiment in spaced parallel relation with respect to the diaphragm plate 82. Another rigid elbow-type tubular fitting 271 has one end inserted through an opening 272 through both of the plates and secured thereto as by welding, in communication with the vacuum power chamber 80a with its free end angularly disposed in parallely spaced relation with respect to the free end of the fitting 270. The free ends of said fittings are interconnecting by a flexible conduit 273 preferably of arcuate configuration to enable the control valve assembly $CV^a$ to have its required operating relative movement with respect to the diaphragm plates 81, 82 to control the operation of the device A as is understood. In this connection it should be noted that the fitting 271 replaces the openings 90, 91, circular embossment 92, ring seal 170, and spring 171 associated with the diaphragm plates in the main embodiment (see FIGURES 2, 4 and 5).

In operation, the configuration, and flexible characteristic of the conduit 273 enables the control valve sleeve 120a to axially move relatively to the valve piston 121a and connected diaphragm plates to control energization of the power diaphragm $MA^a$, and the arcuate contour of this conduit tends to prevent relative rotational movement of the control valve means $CV^a$ with respect to the movable wall $MA^a$, and therefore counterbalances the turning effect of the convolution of conduit 243a connecting the opposite side of the control valve to the rigid fitting 240a secured to and projecting through the cylindrical wall of the power cylinder casing 66. In this manner, the control valve assembly is stabilized against rotation in substantially the position shown in FIGURE 11 thus eliminating the need for the groove and pin connection 207, 208 used in the main embodiment FIGURES 1–10.

*Modified Control Valve Structure and Operation (FIGURES 12 and 13)*

Figure 12:
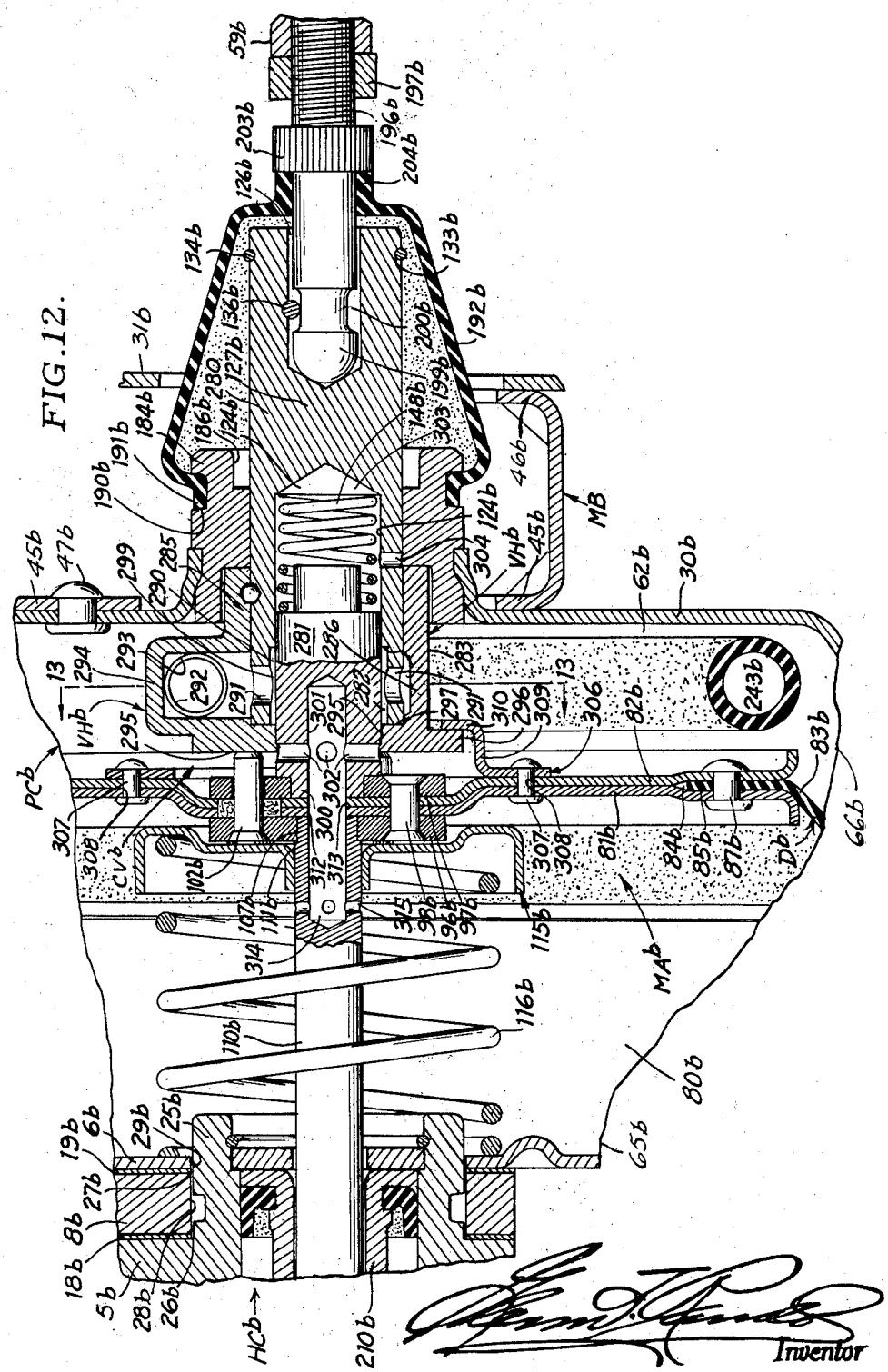
FIGURE 12 is a modified form of the control valve means in which the power chamber is connected to the interior of the valve means via a longitudinal passageway in the inner valve element.

Depicted in FIGURES 12 and 13 is a modified control valve mechanism $CV^b$ in which parts corresponding to those already described are designated by like reference characters distinguished, however, by suffix "b," and which utilizes a passageway coaxially disposed within the inner valve element for connecting the power chamber of the power device to the interior of the control valve assembly in lieu of the rigid elbow tube 169 of the main embodiment, otherwise the structure of this modification is similar to that of the main embodiment.

The modified structure comprises: outer and inner interfitting relatively movable cylindrical elements 280, 281, more specifically designated a sleeve and a piston respectively, the sleeve element having a blind longitudinal bore 124b extending from the inner end to a medial point substantially therein and a reduced diameter coaxial blind bore 126b extending from the other end to such depth as to provide a thrust wall 127b between the closed ends of said bores. A counterbore 282 is provided in the open end of the bore 124b to provide an internal annular shoulder at 283. Encircling the valve sleeve 280 is a valve housing $VH^b$ comprising two semicircular upper and lower segments 285, 286 securely clamped about the valve sleeve in airtight sealed relation thereto by a pair of hex cap screws 152b. Projecting through holes 153b provided in a pair of laterally extending flanges or ears 154b integral with the ends of the semicircular portion of the lower segment 286, into threaded engagement with threaded holes 156b provided in complemental lateral flanges or ears 157b integral with the ends of the semicircular portion of the upper segment 285 to thus tightly clamp the two halves 285, 286 of the valve housing $VH^b$ about the valve sleeve 280 to produce a unitary assembly thereof. Formed in the inner curved surface of each of the valve housing segments 285, 286, is a semicircular channel 288, 289 respectively merging at the mating surfaces on the lateral flanges 154b, 157b to produce in assembly an internal annular channel 290 encircling the outer cylindrical surface on the valve sleeve 280. This annular channel is in continuous communication with the interior of the counterbore 282 via a plurality of ports 291 through a circularly aligned wall portion of the outer valve element, and with the interior of the valve housing via a rigid curved tube 292 having one end secured in a horizontal bore 293 communicating with passageway 163b provided within an upstanding elongated surface boss 294 integral with the upper housing segment 285, the other downturned end of the tube receives one end of a convolution of flexible conduit 243b to connect the vacuum source IM to the interior of the control valve mechanism $CV^b$. The inner ends of the upper and lower valve housings 285, 286 are each made with a circularly aligned inner semicircular flange to form in assembly an annular valve land 295, and an outer semicircular flange to form in assembly an annular flange 296. The inner face of the valve lands intimately engage the inner end of the valve sleeve 280 to effect an airtight seal therebetween and which is longitudinally spaced from the internal annular shoulder 283 to provide an annular vacuum chamber 299 in continuous communication with the annular channel 290 via the ports 291. The inner ends of the valve housing segments are normally predeterminately spaced from the diaphragm hub disc 97b to provide the aforesaid relative operating movement between the valve elements 280, 281, said ends being engaged by the free ends of the actuating pins 102b. The inner valve element 281 comprises: a shouldered reduced diameter end portion at 300 which is pressfitted into the disc opening 107b and welded, if necessary, to provide a rigid assembly of the disc and inner valve element for movement as a unit, a longitudinal bore 301 extends from the inner end of the element a predetermined depth, and intersecting this bore is a plurality of ports 302 through the wall of the bore and disposed in circular alignment with one-half of the area of each port normally covered by the land 295 to isolate the vacuum chamber 299 and place the bore 301 in communication with the atmosphere via the exposed other half of the ports 302 whereby relative movement of the outer valve element 280 with respect to the inner valve element selectively connects the ports 302 to atmosphere and to the vacuum source as is understood. The other end of the inner valve element is identical to the main disclosure (see FIGURE 2) and predeterminately normally spaced from the thrust wall 127b to provide an atmospheric chamber 303 therebetween, the latter chamber serving to house the valve return spring 148b with one end thereof bearing on the end of the valve element and the other end reacting on the thrust wall 127b tending to separate the pair of valve elements 280, 281, said atmospheric chamber being vented to the atmosphere via port 304 to prevent compressive effects between the valve elements when moved relatively to each other to control operative energization of the power cylinder.

A ring-like stop member 306 is provided on the rear face of the diaphragm plate 82b and is secured thereto as by rivets 307 inserted through aligned holes 308 which pass through said stop member and the diaphragm plates 81b, 82b to produce a unitary assembly thereof. The lower portion of the stop member is formed with a rearwardly extruded arcuate wall 309 concentric to the axis of the control valve CVb, said wall terminating in a complementally formed inturned flange 310 parallel to the member 306 (see FIGURE 13). The terminating horizontal ends 311 of the arcuate wall and flange 310 cooperate with the undersides of the opposed flanges 154b to prevent relative rotational movement of the valve housing body VHb with respect to the power diaphragm assembly MAb thus maintaining the control valve assembly in correct working relationship to the convolution of flexible conduit 243b which enables unrestricted reciprocable movement of the power assembly MAb in applying and releasing the vehicle brakes. This connection between the valve housing VHb and diaphragm plates is the equivalent to the groove 207 and pin 208 connection disclosed in the main embodiment (see FIGURE 2). The inturned flange 310 is engageable by the outer surface on the lower confronting portion of the flange 296 to limit axial separation of the inner and outer valve elements 280, 281 under influence of the valve return spring 148b and thus serves to establish the limits of relative movement operation between said valve elements as is understood.

Coaxially disposed with respect to the longitudinal bore 301 are holes 312, 313 through the central portion of the diaphragm plates 81b, 82b respectively, and a longitudinal bore 314 extending from the shouldered secured end of the work-performing element 110b a limited depth. Radially disposed ports 315 are provided in the element 110b and which communicate with the bore 314 and power chamber 80b whereby the latter chamber is connected the the opposite side of the control valve means CVb, it being noted that the radial ports 315 are spaced ahead of the movable spring seat member 115b to prevent closure thereof when the seat is actuated relatively to the movable wall MAb.

In operation, the normally released disposition of the parts is shown in FIGURE 12 wherein, with the engine running, reduced pressure (vacuum) produced in the intake-manifold IM is conveyed through conduit 243b, tube 292, annular channel 290, ports 291 to evacuate air from the vacuum chamber 299 between the outer and inner valve elements 280, 281 which conditions the control valve mechanism CVb for operation to control operative energization of the power chamber PCb as explained in connection with the main embodiment.

In this normal disposition of the parts aforesaid as shown in FIGURES 12 and 13, the atmospheric and vacuum power chambers 62b, 80b respectively are vented to atmosphere, the power chamber being vented via ports 302, bore 301, openings 312, 313, bore 314 and radial ports 315, the ports 302 being in continuous communication with the atmospheric chamber 62b of the power cylinder which in turn is vented to the atmosphere via the air filter device AF as in the case of the main disclosure previously described. Accordingly, the power cylinder may be termed "air-suspended" when the power member MAb and connected parts are in their respective normally released positions portrayed in FIGURE 12.

Initial depression of the pedal P to its first dashed line position of FIGURE 1 would in the present instance, simultaneously move the valve sleeve and piston 280, 281, the power member MAb and connected work-performing element 110b and hydraulic piston 210b which advances the piston cup seal 211 into the hydraulic pressure working cylinder 50b to a position similar to that shown in FIGURE 7 of the main embodiment wherein the compensating port 51 is closed thereby conditioning the master cylinder HCb for operation to apply pressure on the liquid confined in the working chamber and hydraulic lines to the wheel cylinder of the vehicle brakes to effect expansion of the brake shoes into frictional contact with the inner cylindrical surface on the brake drums rotatable with the vehicle road wheels to apply the brakes as is understood.

The aforesaid simultaneous actuation of the parts is provided by the normal preloaded status of the control valve return spring 148b which is characterized identically to that of its counterpart in the main embodiment (FIGURES 1–11).

Continued pressure on the pedal P after the compensating port 51 has been closed and ensuing pressure resistance on the hydraulic piston 210b tending to arrest further movement of the latter, cause the spring 148b to yield with consequent relative movement of the outer valve element 280, with respect to the inner valve element 281 which places the valve land 295 to the left of the ports 302 thereby progressively opening said ports to the annular vacuum channel 299 after isolating said ports from atmosphere which causes a subatmospheric condition in the power chamber 80b induced by withdrawal of air therefrom via the longitudinal bores 301, 314, openings 312, 313 and ports 315 which enables atmospheric pressure acting across the opposite side of the diaphragm plates 81b, 82b to operatively energize the same and the connected hydraulic piston HCb to move forwardly to thus provide power assistance in applying the vehicle brakes in the same manner as previously described in connection with the main embodiment.

The present modified arrangement of the valving mechanism CVb has the same operational relationship with the reactive and return spring 116b acted on by the movable spring seat 115b by the actuating pins 102b bearing on the forward end of the valve housing VHb, and its connection to the pedal P as already described in the main embodiment, FIGURES 1–10.

Aside from simplifying the connection of the valve control housing to the power chamber, the present valvular modification is especially suited for incorporation in a power cylinder of the collapsible bellows-type comprising a stationary head and a movable head since the exposed movable head presents no sealing problems with respect to the movable parts of the valving and connection of the pedal mechanism thereto.

This modified valve control has the usual follow-up action, since the valve piston 281 is connected to the power diaphragm MAb for movement as a unit, and the valve sleeve 280 is actuated relatively to the valve piston in response to operating the pedal P to control operative energization of the power cylinder PCb. This follow-up action tends to overtake, and "lap" the ports 302 and valve land 295 unless brake-applying movement of the pedal continues. Whenever the operator stabilizes his force on the pedal at any operating position thereof, the inner valve element moves sufficiently in the direction of pedal movement to place the land 295 in circular alignment with the ports 302 thereby closing the latter ports since the diameter of these ports is slightly less than the width of the valve land. This valvular operation is commercially known as the "brake-holding" position.

If the operator desires to apply his force, after the full power force has been developed, or, if there is a power failure, such direct physical force can be exerted on the hydraulic piston 210b through the inner end of the valve sleeve engaging the power diaphragm hub disc 97b which operation takes up all of the relative operating movement therebetween and transmits the physical force exerted on the pedal P directly to the hydraulic piston 210b clearly demonstrated by the relative normal disposition of the parts in FIGURE 12.

It should be importantly noted in connection with this modified embodiment of the invention, that the valve return spring 148b may be eliminated since the valve piston 281 is connected with the power assembly to move therewith. Under these circumstances, the master cylinder piston return spring 212 serves to return the valve piston 281 to normal position, and the reaction spring 116b biases the valve sleeve 280 to its normal position, and therefore, relative displacement of these two valve elements from normal disposition to operating "on" disposition is induced by reaction from said work-performing element when stabilized to cause the normally preloaded status of the spring 212 to yield.

*First Modified Support Structure for Power Cylinder (FIGURE 14)*

This modified mounting structure for the power cylinder PC utilizes a headed elongated pin 320 in lieu of the threaded cap bolt 33 described in connection with the main embodiment, and parts similar to those already described are designated by like reference characters distinguished, however, by suffix "C," said pin having its intermediate portion external to the power cylinder end wall 30c longitudinally splined or otherwise indented at 321 on which is mounted a sleeve 322 having its exterior surface formed with a plurality of interconnected flat surfaces, as for example, of hexagonal configuration for engagement by an open end wrench for manually rotating the same, therefore the pin aforesaid through the splined connection therewith. The internal surface of the sleeve is formed with complemental indentations 323 for cooperating with the indents 321 on the intermediate portion of the pin 320 to produce the said splined connection therebetween, whereby rotational movement imparted to the sleeve 322, simultaneously rotates the headed pin 320 yet accommodates relative sliding movement between the pin and sleeve. The portion of the splined surface of the pin 320 which projects externally of the power cylinder end wall 30c is of less length than the length of the sleeve 322 so as to enable said sleeve to be drawn tightly between the wall 30c and firewall 31c of the vehicle in response to engaging an internally threaded axle bore 325 extending a limited depth from the outer end of the pin 320, with an externally threaded stud 326 rigid with the firewall whereby the power cylinder is rigidly secured to the firewall in predetermined space relation thereto as defined by the length of the sleeve 322 impinged between as a result of threading the pins 320 into tightly threaded engagement with the aforesaid studs.

This arrangement differs from the hex-nut and bolt structure of the main embodiment by substituting an internally threaded pin for the externally threaded bolt 33 to enable mounting the present servo-mechanism A on vehicles which come equipped with externally threaded studs welded to the firewall instead of internally threaded collars originally used for supporting the suspended-pedal operated master brake cylinder in operating position on the forward side of said firewall.

*Second Modified Support Structure for Power Cylinder (FIGURE 15)*

This second modification discloses new and novel means for supporting the power cylinder PC on the forward side of the vehicle firewall by utilizing the threaded collars 41 of the main embodiment, and parts similar to those already described are designated by like reference characters distinguished, however, by suffix "d," and no alterations in the structure of the vehicle are required in the immediate area in which the hydraulic master cylinder was formerly mounted. This new arrangement is quite simple and comprises: a plurality of pins 330 axially bored a predetermined depth toward their headed end and attached securely to the power cylinder end wall 30d at that end in the same spaced relation as the internally threaded collars 41d on the firewall. A corresponding number of cap bolts 331 having an intermediate smooth portion 332 of the same diameter as the minor diameter of the threaded portion through the collars 41d, whereby the bolts 331 are first threaded through the collars 41d from the driver side of the firewall 31d to present the smooth portion of the bolts in circular alignment with the length of the collars to negate further relative threading movement of the bolts with respect to collars 41d. Next, the threaded ends of the bolts are rotated into engagement with complementally threaded portions defining the axial bores in pins 330 until the opposite end walls of the pins 330 are drawn tightly into engagement with the confronting surface portion on the firewall, or tubular spacer members, such as the elongated hex-nut, may be inserted between the power cylinder end wall 30d and firewall 31d and through which the pins 330 project, to improve the appearance of and additionally stabilize the power cylinder on said firewall as is understood.

This novel mounting arrangement lends itself readily to vehicles equipped with threaded bushings rigid with the firewall and formerly used to receive the master cylinder mounting bolts, as standard cap bolts require only slight alteration to incorporate the smooth body portion intermediate the head and threaded end portion to secure the power cylinder in operating position.

From the foregoing description, considered with the various illustrations of the different embodiments of my invention, it will be seen that certain interrelated components of booster type servo-mechanism A possess similar functional characteristics such that interchangeability is readily effected, particularly in connection with the power controlling features and means for mounting the apparatus in operating position as exemplarily depicted on the firewall of a motor vehicle. Also certain components may be eliminated from the structure without rendering the apparatus A inoperative. However, in this latter instance the characteristics of pedal operation are changed to cause the brake-applying control to be modified to such an extent as to be less predictable as to the timing and force exerted by the power cylinder PC resulting from a given pressure on the pedal P.

The present invention is directed to a booster brake mechanism for motor vehicles wherein a novel type of booster motor is employed in conjunction with the conventional hydraulic master cylinder to produce new and unobvious cooperation therebetween, therefore dependence on each other for the servomotor to attain operative status in response to operator-actuation of associated pedal mechanism, to provide highly desirable characteristics in pedal operation during power boost. Aside from the use of the motor in a booster brake mechanism, the novel motor is capable of application in other uses, and therefore, such motor per se forms the subject matter of certain of the claims appended hereto.

Reference is now made to the terminology used in the foregoing description and in the appended claims in which the identifying expressions and/or terms employed are intended to convey meanings which include the range of reasonable equivalents in the patent sense. For example, the expressions, "servomotor," "motor," "power cylinder," "power asembly," "servo," "vacuum cylinder," "booster servo," are intended to include any casing and/or chamber having a pressure-responsive movable assembly therein, whether such assembly includes a solid piston or a flexible diaphragm, or some other member serving the same purpose. The terms "front," "rear," "forward," "bottom," "top," "right," "left," and other directional words or characters are intended to have only relative connotation for convenience in describing the structure as illustrated in the drawing, and are not intended to be interpreted as requiring any particular orientation with respect to associated structure external to the present disclosure or to the operating position thereof.

Although several particular embodiments of my invention have been disclosed herein and which are believed well calculated to fulfill the objects above stated, it will be appreciated that I do not wish such to be limited to the exact construction and/or arrangement of parts shown, since it is evident that modifications, variations, changes and substitutions may be made therein without departing from the proper scope or fair meaning of the subjoined claims.

Having thus described my invention, I claim:

1. A pressure fluid operated servomotor including a casing in which a movable power assembly is actuatable by a pressure differential on opposite sides thereof, said power assembly dividing the interior of said casing into a constant pressure chamber and a variable pressure chamber, a source of pressure different from atmosphere, and an operator-operated member having a normally released position, the improvement which comprises: an element movable to perform work under influence in part of power-actuation, movement of said element being opposed by a normally preloaded spring; a control valve having at least two principal cooperating elements adapted to have operative follow-up association with said power assembly to control the same, said valve elements being relatively displaceable from normal "off" position wherein said servomotor chambers are interconnected to balance pressures therein to inactivate said servomotor, to operating "on" position wherein said servomotor chambers are isolated to enable establishment of differential pressures therein to activate said servomotor as a function of the reaction from said work-performing element; a fluid connection between said control valve and said variable pressure chamber via said power assembly; spring means including a normally preloaded spring operably disposed in said variable pressure chamber to react between said casing and one of said valve elements actuated directly by said operator member, said last-mentioned spring being characterized by progressively increasing reaction on said operator member in accordance with the distance said power assembly moves; operating mechanism mounted in part on said power assembly to interconnect said spring means and one valve element for movement as a unit; and normally spaced engageable portions disposed respectively on said one valve element and said power assembly to define the said relative displacement of said valve elements, said portions being engageable to effect "straight-through" operation of said power assembly and work-performing element from said operator member in cooperation with or independently of an energized status of said servomotor.

2. A servomotor constructed in accordance with claim 1 wherein the movable power assembly comprises: a pair of cup-shaped plates having coaxially disposed interfitting central embossments and offset peripheral marginal portions in the end walls thereof; a ring-like flexible wall having its inner peripheral marginal portion confined between the offset portions of the plates; a plurality of circumferentially spaced registering holes through the offset portions of the plates and the marginal portion of the flexible wall therebetween; a corresponding number of fasteners received through said holes for securing the inner marginal portion of the flexible wall and plates in air-tight assembled relationship; a circular hub disc provided on opposite sides of said embossments; a plurality of circumferentially spaced holes through the discs and plates; fasteners projecting through a portion of said holes to secure the two discs and plates in a unitary assembly; and a hole formed centrally in the disc adjacent the other valve element for piloting one end thereof to provide substantially coaxial disposition of the movable power assembly with respect to the control valve.

3. A servomotor constructed in accordance with claim 2 wherein the servomotor casing comprises: two cup-shaped shells having their open confronting ends circularly flanged outwardly; a plurality of circumferentially spaced holes through said shell flanges in registering disposition; a pair of metallic rings having holes registering with those in the shell flanges; a corresponding number of fasteners projecting through the holes in the shell flanges and said metallic rings disposed between said flanges to secure said shells in a rigid metal-to-metal assembly to produce said servomotor casing; a semi-circular channel provided in the inner marginal portion of each ring in confronting relationship to each other to produce an annular channel of circular cross-section therebetween, the free inner edges of said semi-circular channels terminating in laterally disposed outturned flanges to produce a circular opening into the annular channel aforesaid; and an annular bead of larger circular cross-section than the annular channel aforesaid terminating the peripheral edge of said flexible wall, said bead being adapted to engage said annular channel between said metallic rings whereby the periphery is anchored in juxtaposition with respect to the inner peripheries of said shell flanges under slight compression to effect an air-tight seal therebetween when the shells are assembly as aforesaid.

4. A servomotor constructed in accordance with claim 3 wherein said operating mechanism comprises: a centrally apertured spring seat member movable on said work performing element from a position normally engaging said movable power assembly; a plurality of slidable pins projecting through the open holes through the circular discs and plate embossments, one end of said pins engaging said spring seat member and the opposite ends thereof engaging the valve element acted on directly by said operator-operated member whereby sliding movement of said valve element imparts a like sliding movement to said spring seat member relative to said movable power assembly whereby said last-named spring produces progressively increasing reactive forces on the operator-operated member during relative displacement of said valve elements to operating "on" position.

5. A servomotor constructed in accordance with claim 4 wherein the holes in the plates through which the said pins project are of larger diameter than those in the hub discs in alignment therewith, to form ring-like cavities around each pin for reception of a washer-type pliant sealing member in each cavity to effect an air-tight sliding fit between the said pins and the movable power assembly.

6. A servomotor constructed in accordance with claim 1 wherein said control valve additionally comprises: a valve housing encircling the one valve element acted on by said operator-operated member and movable with said one valve element in air-tight sealed relation; a pair of diametrically disposed cavities in the interior cylindrical surface of said housing communicating respectively with two diametrically disposed longitudinally spaced openings in said one valve element; a pair of fluid passageways leading respectively from said cavities to said source and to said fluid connection communicating with said variable pressure chamber disposed on the side of said power assembly opposite to that on which said control valve is operatively disposed; a passageway in the other valve element communicating air at atmospheric pressure to the valve opening connected to said variable pressure chamber when said valve elements are in normal "off" position; a working land on the other valve element cooperating with the valve opening connected to said variable pressure chamber to selectively connect this latter valve opening to said last-named passageway and to said source; and a fluid chamber between said valve elements interconnecting the valve opening connected to said source with said working land.

7. A servomotor constructed in accordance with claim 6 wherein the one valve element is a cylindrical sleeve and the other valve element is a piston slidably disposed within said sleeve.

8. A servomotor constructed in accordance with claim 7 wherein said valve housing comprises: two sections detachably mounted on said cylindrical sleeve by clamping fasteners to produce a unitary assembly thereof.

9. A servomotor constructed in accordance with claim 8 including valve support means comprising: a pair of interengaging elements incorporated between said control valve and servomotor casing, one of said elements being fixed with respect to the servomotor casing and the other element being movable with one of the elements of said control valve whereby the latter is mounted for sliding movement as a unit on the servomotor casing independently of said power assembly.

10. A servomotor constructed in accordance with claim 1, the combination of a normally preloaded spring operably disposed between said valve elements to bias them apart to normal disposition in cooperation with said spring means.

11. A servomotor constructed in accordance with claim 1 in which said valve spring is characterized by a normally preloaded strength of such magnitude that initial operator force is effective thereby to move said control valve in normal disposition simultaneously with said power assembly and work-performing element to positions whereat reaction from said work-performing element induces said spring to yield and thereby accomodate relative displacement of said valve elements to operating "on" position under increased operator actuation.

12. A differential fluid pressure operated servomotor including: a power cylinder having a pair of spaced end walls, coaxially disposed apertures through said end walls; a pressure-responsive movable wall having a normally released position in the power cylinder and dividing the latter into a power variable pressure chamber and an atmospheric chamber the improvement which comprises: a member movable to perform work acted on at one end by the movable wall with the other end thereof extending through the aperture in one of the end walls, movement of said element being opposed by a normally preloaded spring; a stationary support member; means for detachably supporting the power cylinder on said support member; unitary control valve means comprising an inner and an outer telescopically-related element relatively displaceable from normal disposition wherein both chambers of the power cylinder are interconnected to establish equivalent pressures therein for power-inactivation of said servomotor, to operating "on" position wherein said power cylinder chambers are isolated to enable establishment of differential pressures therein for power-activation of said servomotor; an annular bearing fixed on the other end wall in coaxial disposition with respect to the aperture therein, said bearing slidably receiving a portion of said outer valve element to slidably support the control valve means as a unit independently of said movable wall to control operation of said servomotor; a pair of coaxially disposed bores in the outer valve element with one of said bores slidably receiving the inner valve element in sealed relation thereto; a thrust wall medially disposed in the outer valve element and common to the confronting ends of said bores to isolate them; an atmospheric valve chamber provided between the thrust wall and confronting end of the inner valve element; a longitudinal bore through the inner valve element for connecting said valve chamber to the power cylinder atmospheric chamber; limiting means including complemental normally spaced engageable portions on said movable wall and said outer valve element, and between said valve element, to define the relative operation of said valve elements; a normally preloaded spring operably disposed within said valve chamber with opposite ends thereof reacting respectively on said thrust wall and the confronting end of said inner valve element for biasing them apart and accommodating their movement toward each other within the limits of their relative operation aforesaid, said valve spring being characterized by a normally preloaded strength of such magnitude that modulation thereof to accommodate relative operation of said valve elements to "on" position to control activation of said servomotor, is induced by reaction from said work-performing member effected under influence of initial operator force on the outer valve element; an operator-operated member having a normally released position from which it is operable to displace said outer valve element relatively to said inner valve element; means on the movable wall engageable by the other end of the inner valve element enabling their movement together in follow-up relationship under influence of the valve spring aforesaid; a spring seat member slidable relatively with respect to said movable wall and work-performing member, and normally disposed in engagement with said movable wall; mechanical means interconnecting the spring seat with the outer valve element for movement as a unit relative to said movable wall in accordance with the relative operation of said valve elements whereby said spring seat is effective to move the movable wall in a releasing direction only; tubular conduit means for connecting one side of the outer valve element to a source of pressure difference from atmosphere and the opposite side thereof to the movable wall to accommodate the relative operation aforesaid between the outer valve element and movable wall; and reactive and return spring means having a normally preloaded spring encircling a portion of the work-performing member, with its ends bearing respectively on the spring seat and the inner marginal face portion of the aperture in the one end wall of the power cylinder to yieldably oppose relative operation of the outer valve element, said latter spring being characterized by increasing tension progressively induced during relative operation of the outer valve element as aforestated under influence of said operator member.

13. A fluid pressure motor according to claim 12 wherein the outer valve element includes a pair of diametrically disposed longitudinally spaced openings through the wall thereof cooperating with a pair of annular lands on the inner valve element longitudinally spaced to form a ringlike space therebetween whereby the ring-like space is in continuous communication with one of the openings in the outer valve element and one of the annular lands is adapted to selectively control communication of the other opening with the ring-like space and the atmospheric valve chamber in response to relative operation of the outer and inner valve elements.

14. A fluid pressure motor according to claim 13 in which the outer valve element is provided with an external annular groove adjacent its outer end, and a split-type stop ring engaging said groove is adapted to abut the confronting face portion on the annular bearing to limit the operating stroke of said outer valve element.

15. A fluid pressure motor according to claim 13 including a longitudinal surface channel terminating at the outer end of the outer valve element; a radial hole through the cylindrical wall of the annular bearing; and a pressfitted pin through said hole projecting into said channel to prevent relative rotational movement between the outer valve element and annular bearing.

16. A fluid pressure motor according to claim 12 in which the movable wall comprises a pair of cup-shaped plates each having a peripheral marginal offset portion to provide an annular channel therebetween; a circular disc disposed centrally on the outer side of each plate; a plurality of circumferentially spaced holes through the discs and plates; fasteners incorporated in a portion of said holes to secure the discs and plates in a rigid assembly.

17. A fluid pressure motor according to claim 16 in which the means on the movable wall comprise a reduced diameter extension teminating the other end of the inner valve element; and a circular opening through the confronting disc aforesaid for piloting said extension in substantially coaxial disposition with respect thereto.

18. A fluid pressure motor according to claim 16 in which the mechanical means operably associated with the spring seat member comprise; a plurality of headed pins slidably projecting through the remaining portion of open holes through the discs and plates in air-tight sealed relation thereto whereby the spring seat member and the outer valve element move in unison to bias the latter toward its released position and the spring seat into engement with the movable wall.

19. A fluid pressure motor according to claim 13 in which the tubular conduit means comprise: a rigid tube connected to the one opening in the outer valve element in constant communication with the annular space on the inner valve element; another rigid tube projecting from the exterior of the cylindrical wall of the power cylinder atmosperic chamber to the interior thereof; a flexible conduit interconnecting said rigid tubes; another flexible conduit connecting the exterior portion of the rigid tube on the power cylinder to the source of pressure different from atmosphere; and a third rigid tube connected to the other opening in the outer valve element; an aperture through both plates of the movable wall for slidably receiving the free end of the last-mentioned tube therethrough in airtight sealed relation thereto into communication with the variable pressure chamber of the power cylinder.

20. A fluid pressure motor according to claim 13 in which the tubular conduit means comprise; a rigid tube connected to the one opening in the outer valve element in constant communication with the annular space on the inner valve element; another rigid tube projecting from the exterior of the cylindrical wall of the power cylinder atmospheric chamber to the interior thereof; a flexible conduit interconnecting said rigid tubes; another flexible conduit connecting the exterior portion of the rigid tube on the power cylinder to the source of pressure different from atmosphere; a rigid tubular fitting having one end secured to the movable wall in constant communication with the variable pressure chamber; another rigid tubular fitting having one end in constant communication with the other opening in the outer valve element; and a flexible conduit interconnecting the free ends of said tubular fittings whereby relative axial movement of the control valve means with respect to the movable wall is accommodated to enable control of energization of the servomotor.

21. A differential fluid pressure operated servomotor including a power cylinder having a pair of spaced end walls, coaxially disposed apertures through said end walls, a pressure-responsive movable wall having a normally released position in the power cylinder and dividing the latter into a variable pressure chamber and an atmospheric chamber, the improvement which comprises: an element movable to perform work under influence in part of said movable wall with one end of said element projecting through the aperture in one of said end walls, movement of said element being opposed by a normally preloaded spring; a stationary support member; means for detachably supporting the power cylinder on said support member; an annular bearing member coaxially fixed on the other of said end walls with respect to its aperture; unitary control valve means comprising an inner and an outer telescopically-related cylindrical valve element characterized by relative operation from a normal disposition, a portion of the outer valve element being slidably disposed in the said bearing member to operatively support said valve means as a unit to control operation of the servomotor; a pair of bores provided in the outer valve element in coaxial disposition with respect to each other with one of said bores slidably receiving the inner valve element in sealed relation thereto; a thrust wall medially disposed in the outer valve element for isolating the inner confronting ends of said bores; an atmospheric valve chamber provided between the thrust wall and confronting end of the inner valve element; a blind axial bore extending from the opposite end of the inner valve element to a predetermined depth; a plurality of radially disposed control ports through the wall of said last-mentioned bore in spaced relation with respect to the open end of said bore; a pair of coaxially disposed openings through the movable wall in coaxial disposition with respect to the bore in the inner valve element; another blind axial bore extending from the one end of the work-performing element a predetermined depth in coaxial disposition with respect to the pair of openings and axial bore in the inner valve element; a plurality of ports predeterminately spaced from the open end of the bore in the work performing element for connecing the variable pressure chamber to the bore in said last-mentioned element thereby placing one side of the control valve means in communication with the variable pressure chamber; a port through the wall of the outer valve element communicating with the interior of said atmospheric valve chamber to continuously vent said chamber to atmosphere; limiting means including complemental normally spaced engageable portions disposed respectively on the movable wall and outer valve element, and between said valve elements, to define the relative operation of latter elements; a normally preloaded compression spring operably disposed within said valve chamber with the ends thereof reacting respectively on the said thrust wall and confronting end of said inner valve element to bias them apart and accommodate their movement toward each other within the limits of their relative operation aforesaid, said valve spring being characterized by a preloaded strength of such magnitude that the initial operator force applied to the outer valve element is transmitted to move the valve means in normal disposiion simultaneously with said movable wall and work-performing element, to positions whereat reaction from said work-performing element induces said valve spring to yield and thereby accommodate relative operation of said valve elements for power-activation of said servomotor; a mechanical connection between the movable wall and inner valve element enabling their movement as a unit in both directions; a ring-like vacuum chamber provided between the inner and outer valve elements; an internal annular valve land on the outer valve element defining one end of said vacuum chamber for selectively connecting the control ports in the inner valve element to atmosphere and to said vacuum chamber to control power-activation of said servomotor, said valve land being normally disposed with the control ports substantially half-open to atmosphere to balance pressures within said power cylinder chambers for power-inactivation of said servomotor; a spring seat member slidably mounted on the work performing element adjacent said movable wall; mechanical means inteconnecting the seat member with the outer valve element for movement as a unit relative to said movable wall and enabling said seat member to act on the movable wall and outer valve element simultaneously in a releasing direction only; tubular conduit means including a rigid and flexible tube for connecting said vacuum chamber to a source of pressure different from atmosphere and for accommodating relative operation aforesaid of said valve elements; reactive and return spring means having a normally preloaded spring encircling a portion of the work performing element with its ends reacting respectively on the seat member and the inner marginal face portion of the aperture in the one end wall of the power cylinder, to yieldably oppose relative operation of the outer valve element to place the control ports in the inner valve element in communication with the vacuum chamber aforesaid, said latter spring being characterized by increasing reaction on the outer valve element progressively induced as a function of operating the latter element from normal disposition for the purpose; and operator-operated means for operating said outer valve element in opposition to the combined reactions from the valve and reactive springs aforesaid.

22. In a pressure differential actuated servomotor including a casing having a pair of spaced centrally apertured end walls and a substantially cylindrical interconnecting wall therebetween, a pressure-responsive wall in the casing movable from a normal released position, the improvement which comprises: an element movable to perform work under influence in part of said movable wall, movement of said element being opposed by a normally preloaded spring; control valve means having outer and inner telescopically-related ported elements movable relatively and as a unit from normal disposition to control operation of said movable wall, a portion of the outer element of such valve means being operably supported by and projecting through the aperture in one of the end walls in substantially coaxial disposition with respect to said work-performing element, and said inner element being engageable with said movable wall for follow-up movement therewith; means defining the relative operation of said valve elements; a normally preloaded spring operably disposed between said valve elements to bias them apart and accommodate their movement toward each other within the limits defined by said last-mentioned means; an operator-operated member mechanically connected directly to the outer valve element to operate the same and thereby control operation of the valve means by overcoming the biasing force of the last-mentioned spring which is characterized by a preloaded strength of such magintude that the initial operator force applied to the outer valve element moves said valve means in normal disposition simultaneously with said movable wall and work-performing element, to positions whereat the reaction from said work-performing element induces said last-mentioned spring to yield and thereby accommodate relative operation of said valve elements for the purpose; a spring seat member movably mounted on said work-performing element and operatively connected to the outer valve element for movement as a unit; and reactive and return spring means including a normally preloaded spring operably reacting between the other end wall of the casing and said seat member to yieldably oppose operation of the latter member whereby said seat member is effective in one direction of movement under influence of said spring means to establish the outer valve element and movable wall in their respective released positions in response to release of said operator member, and movement of said seat member in the opposite direction under influence of operator operation of said outer valve element is effective to remove the reactive force of said spring means from the movable wall during activated status of the latter.

23. In booster-type fluid pressure activated servomotors having a fluid chamber enclosure and a movable wall dividing said chamber into opposing fluid pressure chambers, a source of pressure different from atmosphere connectible to one of said pressure chambers, a control valve normally spring-loaded within to selectively connect said one pressure chamber to said source, and to balance pressures within said pressure chambers for power-activation and inactivation respectively of said servomotor, an operator-operated member for actuating a portion of said control valve in opposition to increasing spring load therein, the improvement which comprises: a work-performing element movable in part by said wall, movement of said element being adapted to react on a different portion of the control valve to induce operation thereof under operator-actuation; reaction spring mechanism including a normally preloaded spring operably disposed in said one pressure chamber to normally react between said casing and said first-named portion of the control valve, said spring being characterized by progressively increasing reaction on said first-named portion of the control valve in accordance with the distance said wall moves; and a mechanical connection between said spring and said first-named portion of the control valve, operable to remove the reaction of said spring from said wall when the latter is subjected to differential pressures.

References Cited in the file of this patent

UNITED STATES PATENTS

| | | |
|---|---|---|
| 2,229,247 | Kamenarovic | Jan. 21, 1941 |
| 2,331,238 | Schnell | Oct. 5, 1943 |
| 2,457,721 | Price | Dec. 28, 1948 |
| 2,548,496 | Rockwell | Apr. 10, 1951 |
| 2,685,171 | Price | Aug. 3, 1954 |
| 2,690,740 | Hupp | Oct. 5, 1954 |
| 2,745,383 | Hupp | May 15, 1956 |
| 2,766,732 | Schultz | Oct. 16, 1956 |